United States Patent [19]

Itoh

[11] Patent Number: 5,365,376
[45] Date of Patent: Nov. 15, 1994

[54] ZOOM LENS

[75] Inventor: Yoshinori Itoh, Kanagawa, Japan

[73] Assignee: Canon Kabushiki Kaisha, Tokyo, Japan

[21] Appl. No.: 936,523

[22] Filed: Aug. 28, 1992

[30] Foreign Application Priority Data

Sep. 2, 1991 [JP] Japan ................ 3-221574

[51] Int. Cl.$^5$ .............................. G02B 15/14
[52] U.S. Cl. ....................... 359/686; 359/715
[58] Field of Search .......... 359/676, 686, 708, 713, 359/714, 715, 781, 771

[56] References Cited

U.S. PATENT DOCUMENTS 4,756,609  7/1988  Estelle .......................... 350/427

FOREIGN PATENT DOCUMENTS 57-201213  12/1982  Japan .
0128220    6/1986  Japan ........................ 359/781
62-235916  10/1987  Japan .
63-271214  11/1988  Japan .
63-276013  11/1988  Japan .
64-72114    3/1989  Japan .
64-88512    4/1989  Japan .
2-72316     3/1990  Japan .

*Primary Examiner*—William L. Sikes
*Assistant Examiner*—David R. Parsons
*Attorney, Agent, or Firm*—Fitzpatrick, Cella, Harper & Scinto

[57] ABSTRACT

A zoom lens is disclosed, having, in order from the object side, a negative first lens unit, a negative or positive second lens unit, a positive or negative third lens unit and a fourth lens unit. The second and third lens units have refractive powers of opposite sign to each other. When zooming from the wide-angle side to the telephoto side, the first to fourth lens units move toward the object side, while simultaneously varying their lens separations.

15 Claims, 21 Drawing Sheets

F I G.14
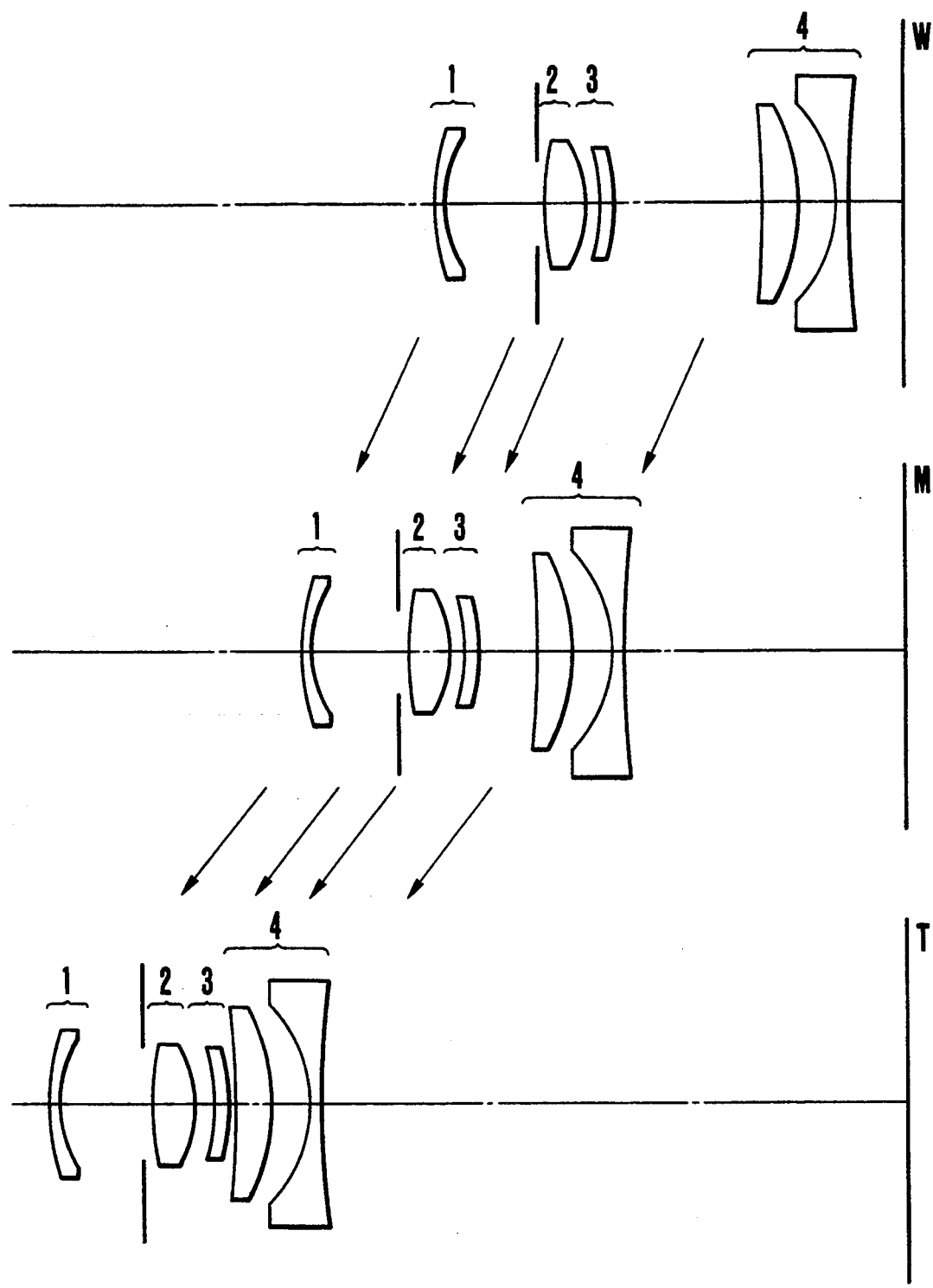

ZOOM LENS

BACKGROUND OF THE INVENTION

1. Field of the Invention

This invention relates to zoom lenses and, more particularly, to zoom lenses of compact form, which nevertheless get a high zoom ratio.

2. Description of the Related Art

Recent minimization of the bulk and size of leaf shutter type cameras or the like has led to a demand for shortening the total length of the compact zoom lens.

In Japanese Laid-Open Patent Application No. Sho 57-201213, there is proposed a compact zoom lens comprising two lens units of plus-minus refractive power from the object side with the air separation between these lens units being varied to effect zooming.

Also, the use of three lens units of minus-plus-minus refractive power in the zoom lens, which are movable for zooming, is proposed in, for example, Japanese Laid-Open Patent Applications No. Sho 63-271214, No. Sho 64-72114, etc. In these publications, the relation in which the first, second and third lens units move during zooming, and the construction and arrangement of the constituent parts of the three lens units are specified to thereby well correct any variation of aberrations with zooming. Thus, a relatively compact lens system having a high optical performance at a zoom ratio of 2 to 3 with 8 or 9 lens elements as a whole is achieved.

An example of adaptation of the zoom lens to the leaf shutter camera by extremely reducing the number of lens elements is proposed in Japanese Laid-Open Patent Application No. Sho 63-276013.

In this Japanese Laid-Open Patent Application No. Sho 63-276013, the front lens unit comprises negative and positive, refractive power or two, lenses, while the rear lens unit comprises positive and negative refractive power lenses. Thus, a zoom lens composed of four lens elements in total is achieved. However, because the zoom lens uses a refractive power distribution type lens (GRIN lens), the difficulty in manufacturing the zoom lens is extremely high, causing the amount of lenses produced through mass production to become low.

Further, Japanese Laid-Open Patent Application No. Sho 64-88512 (U.S. Pat. No. 4,756,609) discloses a zoom lens having four lens units of a minus-plus-plus-minus refractive power arrangement, of which the first and second lens units each comprise one lens element, the third lens unit is a cemented lens, and the fourth lens unit comprises three lens elements of plus-minus-minus refractive power.

Also, in Japanese Laid-Open Patent Application No. Sho 62-235916, there is disclosed a zoom lens having four lens units of a minus-plus-plus-minus refractive power arrangement, wherein the first lens unit is constructed with two elements of plus-minus refractive power, the second lens unit with three elements of plus-plus-minus refractive power, the third lens unit with one element, and the fourth lens unit with two elements of minus-plus refractive power.

SUMMARY OF THE INVENTION

An object of the invention is to provide a compact zoom lens of high range, while still having an optical performance not inferior to that of the prior known zoom lenses.

Another object is to achieve a reduction in the total number of constituent elements of the zoom lens.

A zoom lens of the present invention is constructed with a first lens unit of negative refractive power, a second lens unit of negative or positive refractive power, a third lens unit of positive or negative refractive power and a fourth lens unit of negative refractive power arranged in this order from the long conjugate side (in the usual term, the object side), the separations between the lens units being varied to perform zooming, wherein the refractive powers of the second and third lens units are of opposite sign to each other.

Further, according to embodiments to be described later, for the purpose of zooming from the wide-angle end to the telephoto end, the first, second, third and fourth lens units move toward the long conjugate side.

Further, it is desired that the zoom lens of the invention satisfies the following conditions:

$$|D_{3w}-D_{3t}|>3|D_{2w}-D_{2t}| \quad (1)$$

$$|D_{3w}-D_{3t}|>3|D_{1t}-D_{1w}| \quad (2)$$

where $D_{iw}$ is the separation between the i-th and (i+1)st lens units in the wide-angle end of the zooming range, and $D_{it}$ is the separation between the i-th and (i+1)st lens units in the telephoto end.

Further, as will be seen from the embodiments, the zoom lens of the invention has its first and second lens units each made up by a single lens, its third lens units by either a single lens of positive or negative power, or a cemented lens composed of negative and positive lenses, and its fourth lens unit by a positive single lens and a negative single lens, while still permitting the realization of good optical performance.

BRIEF DESCRIPTION OF THE DRAWINGS

FIG. 14 is a longitudinal section view of a numerical example 8 of a zoom lens of the invention.

Figure 1:
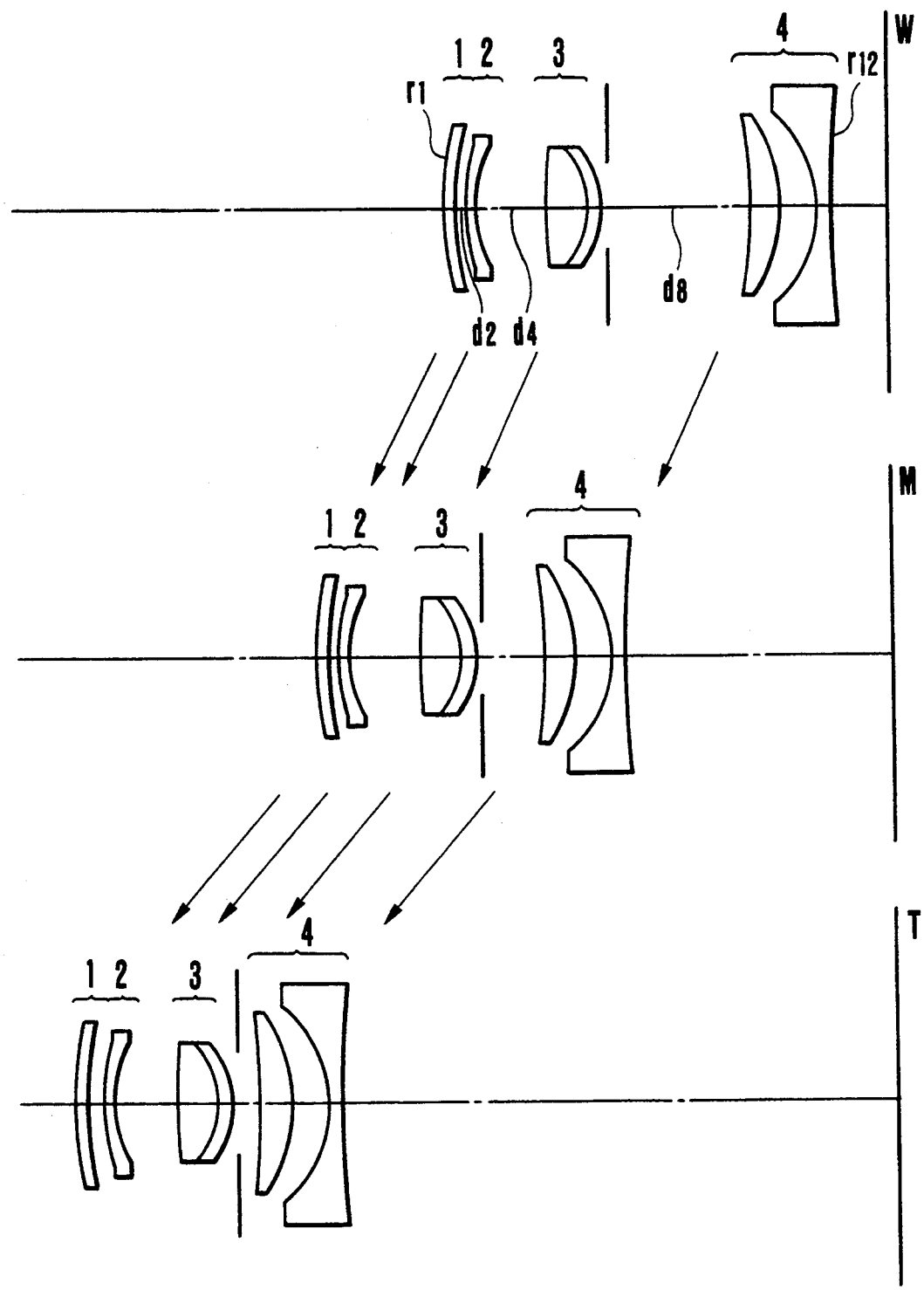
FIG. 1 is a longitudinal section view of a numerical example 1 of a zoom lens of the invention.

In the longitudinal section views and the aberration curves, reference numeral 1 denotes the first lens unit, 2 denotes the second lens unit, 3 denotes the third lens unit, 4 denotes the fourth lens unit, reference character M stands for the meridional curve, S stands for the sagittal curve, d stands for the d-line, and g stands for the g-line.

DETAILED DESCRIPTION OF THE PREFERRED EMBODIMENTS

In FIGS. 1 to 3 and FIGS. 7 to 9, there are depicted the lens forms and the lens movements represented by the numerical data for numerical examples 1 to 6 of the invention.

In the drawings, reference numeral 1 denotes a first lens unit arranged on the object side (long conjugate side), having a negative refractive power and, here, comprising a negative meniscus lens convex toward the object side. Reference numeral 2 denotes a second lens unit likewise comprising a negative meniscus lens convex toward the object side. Reference numeral 3 denotes a third lens unit having a positive refractive power and comprising either a cemented lens composed of a positive lens having a strong convex surface facing the image side (short conjugate side) and a negative lens, or a bi-convex single lens. Reference numeral 4 denotes a fourth lens unit having a negative refractive power and comprising a positive lens having a strong convex surface facing the image side followed, after a spacing therefrom, by a negative lens having a strong concave surface facing the object side.

The first lens unit 1 to the fourth lens unit 4 move toward the object side when zooming from the wide-angle end to the telephoto end. In the zoom lenses of FIGS. 1 to 3 and FIG. 9, as zooming is effected from the wide-angle end W to the telephoto end T, the separation between the first and second lens units increases, the separation between the second and third lens units decreases, and the separation between the third and fourth lens units decreases. In the zoom lenses of FIGS. 7 and 8, the separation between the first and second lens units decreases, the separation between the second and third lens units decreases, and the separation between the third and fourth lens units decreases. Incidentally, the arrows in the drawings schematically show the direction of movement and do not trace the loci of motion. Further, of the embodiments, there are ones in which the first and third lens units move in unison during zooming.

In addition, the zoom lens of each embodiment of the invention is made to satisfy the following conditions:

$$|D_{3w}-D_{3t}|>3|D_{2w}-D_{2t}| \quad (1)$$

$$|D_{3w}-D_{3t}|>3|D_{1t}-D_{1w}| \quad (2)$$

where $D_{iw}$ is the separation between the i-th and (i+1)st lens units in the wide-angle end of the zooming range, and $D_{it}$ is the separation between the i-th and (i+1)st lens units in the telephoto end.

The inequalities (1) and (2) are to regulate the varied separation between the third and fourth lens units at the wide-angle end and the telephoto end in relation to the varied separations between the second and third lens units and between the first and second lens units, respectively. When each condition is violated, not only the various aberrations become difficult to correct, but also the size of the entire lens system increases objectionably.

Figure 2:
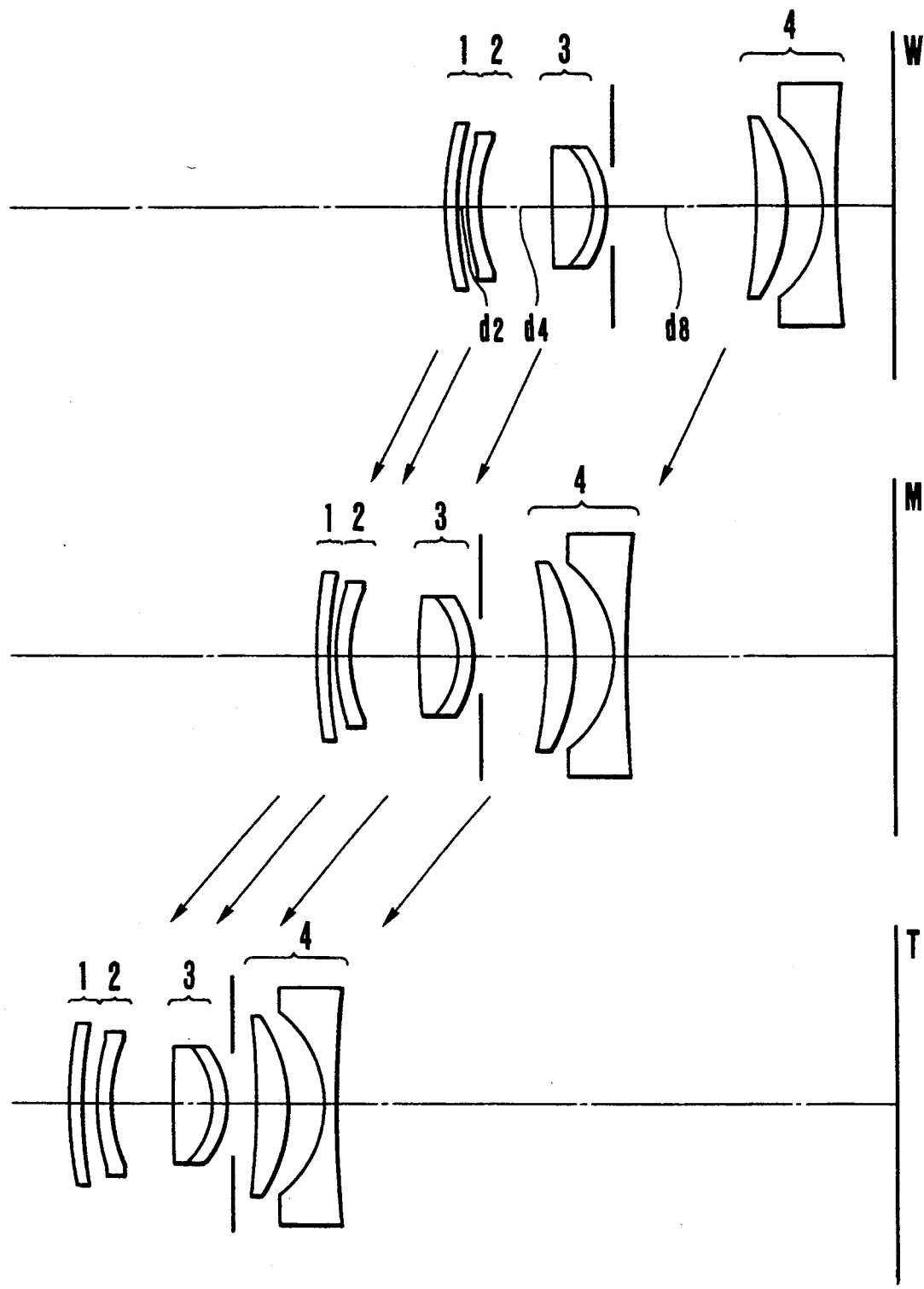
FIG. 2 is a longitudinal section view of a numerical example 2 of a zoom lens of the invention.
Figure 3:
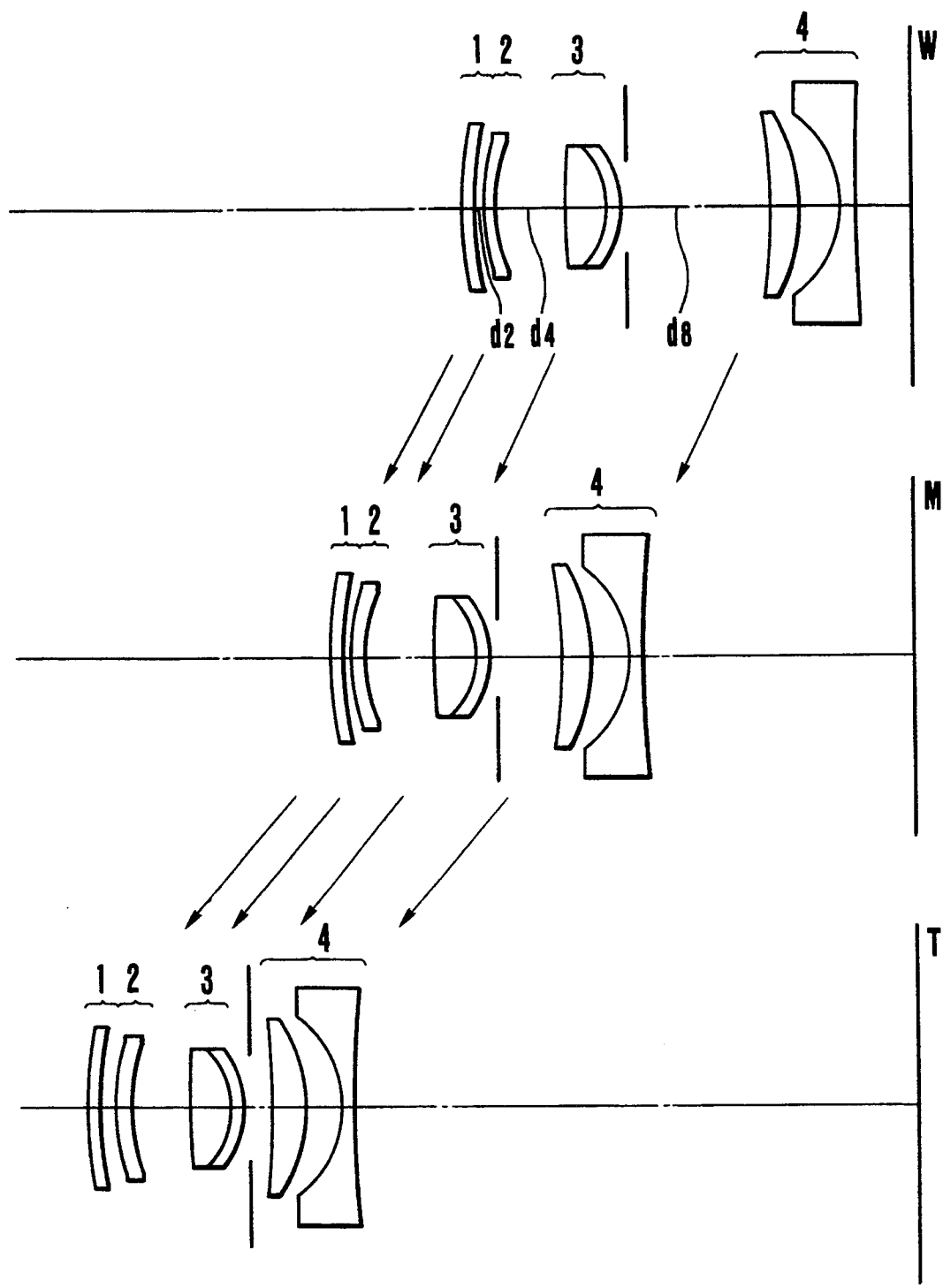
FIG. 3 is a longitudinal section view of a numerical example 3 of a zoom lens of the invention.
Figure 4A:
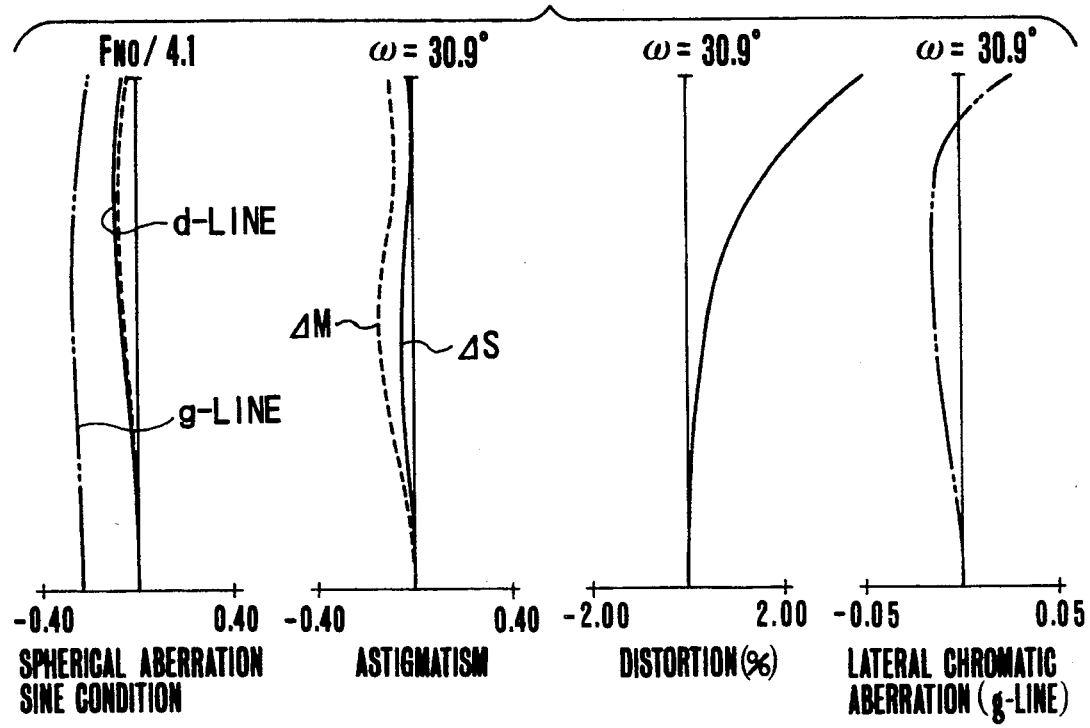
FIGS. 4(A), 4(B) and 4(C) are graphic representations of the aberrations of the numerical example 1.
Figure 4B:
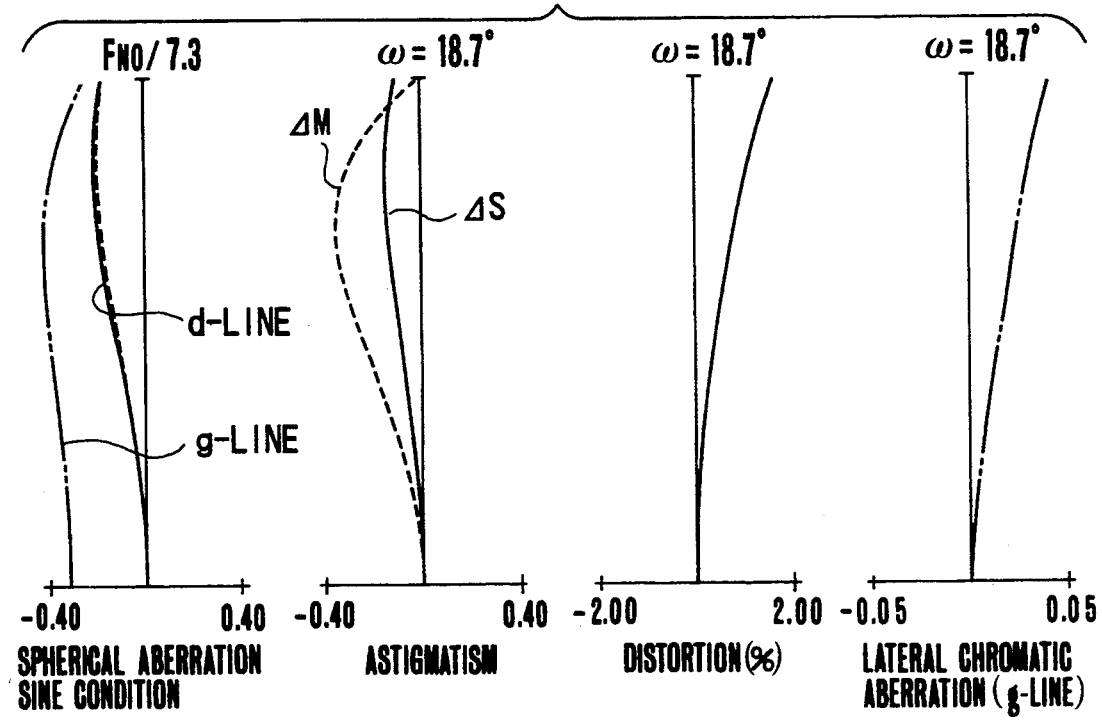
Figure 4C:
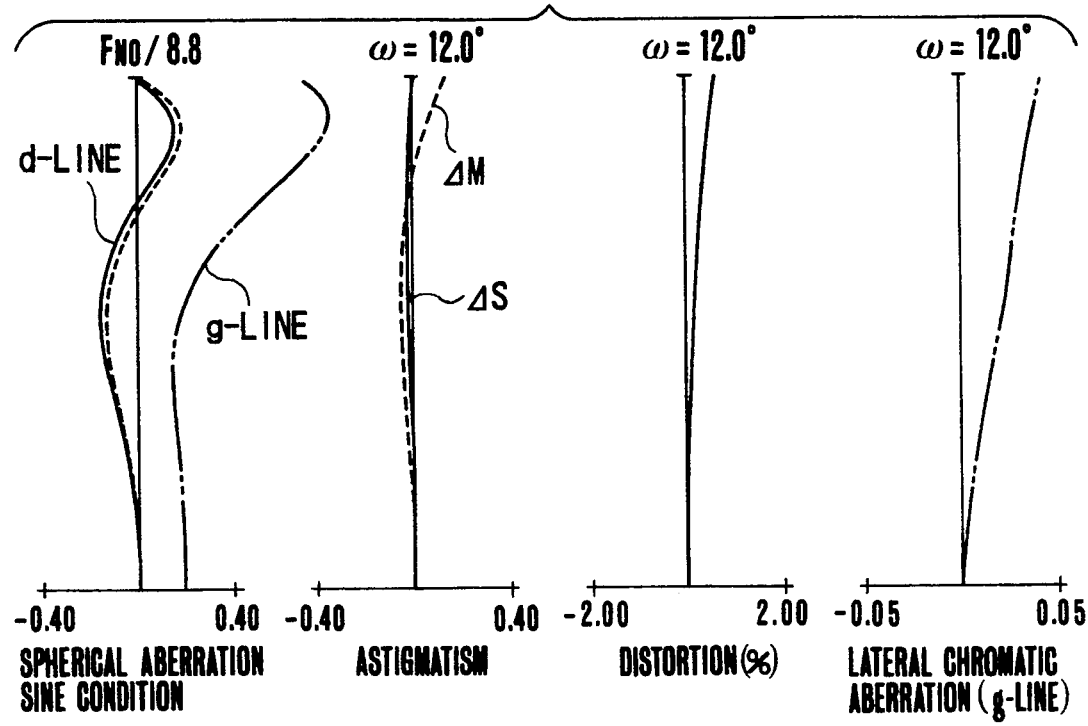
Figure 5A:
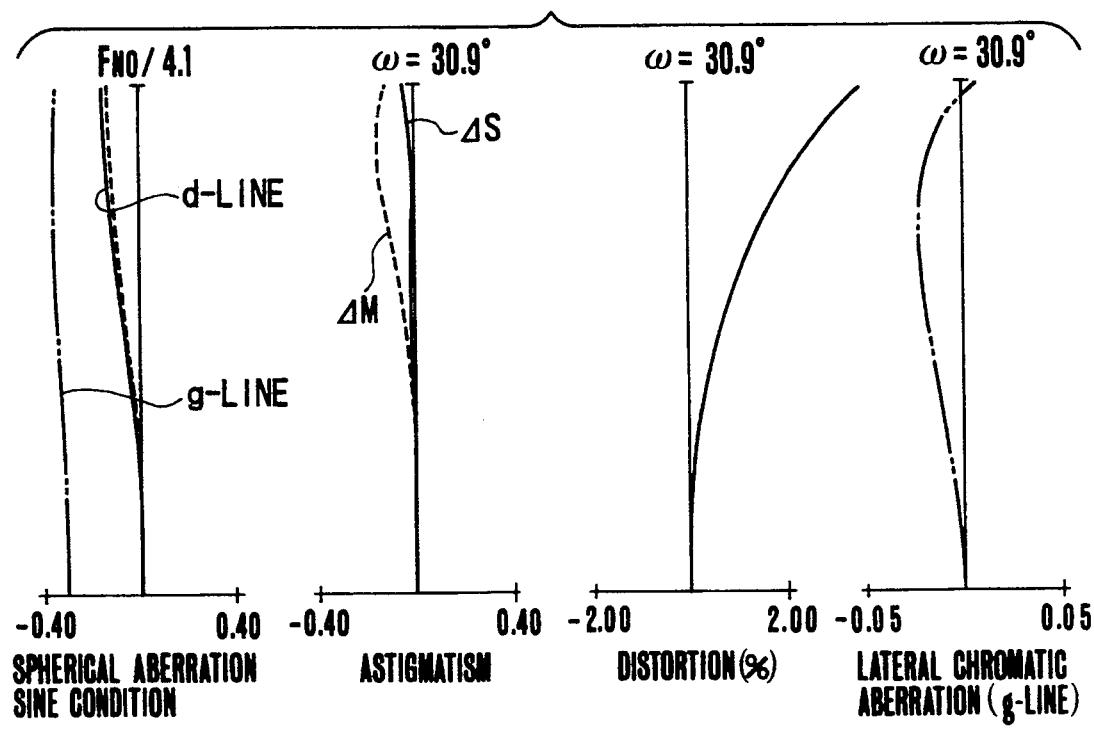
FIGS. 5(A), 5(B) and 5(C) are graphic representations of the aberrations of the numerical example 2.
Figure 5B:
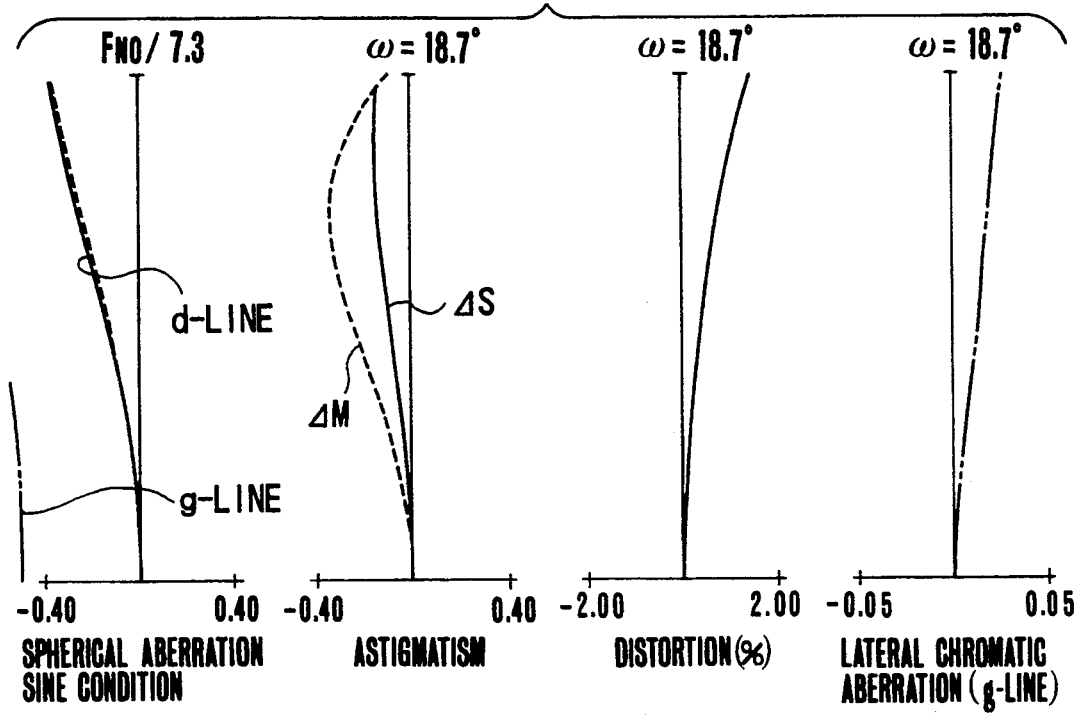
Figure 5C:
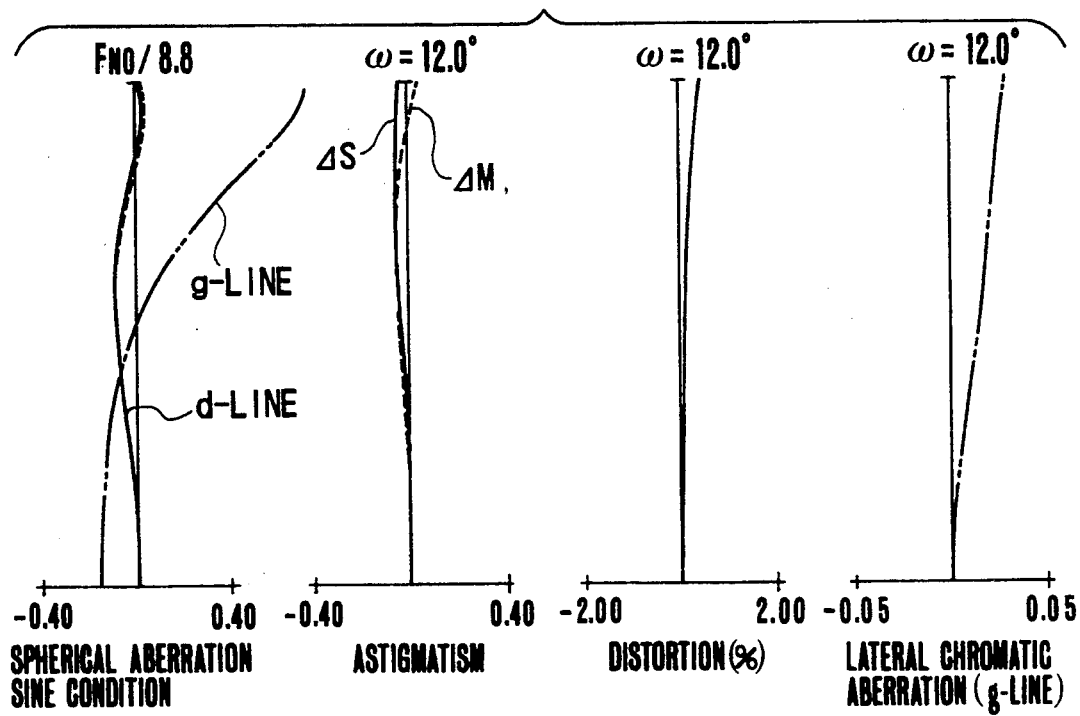
Figure 6A:
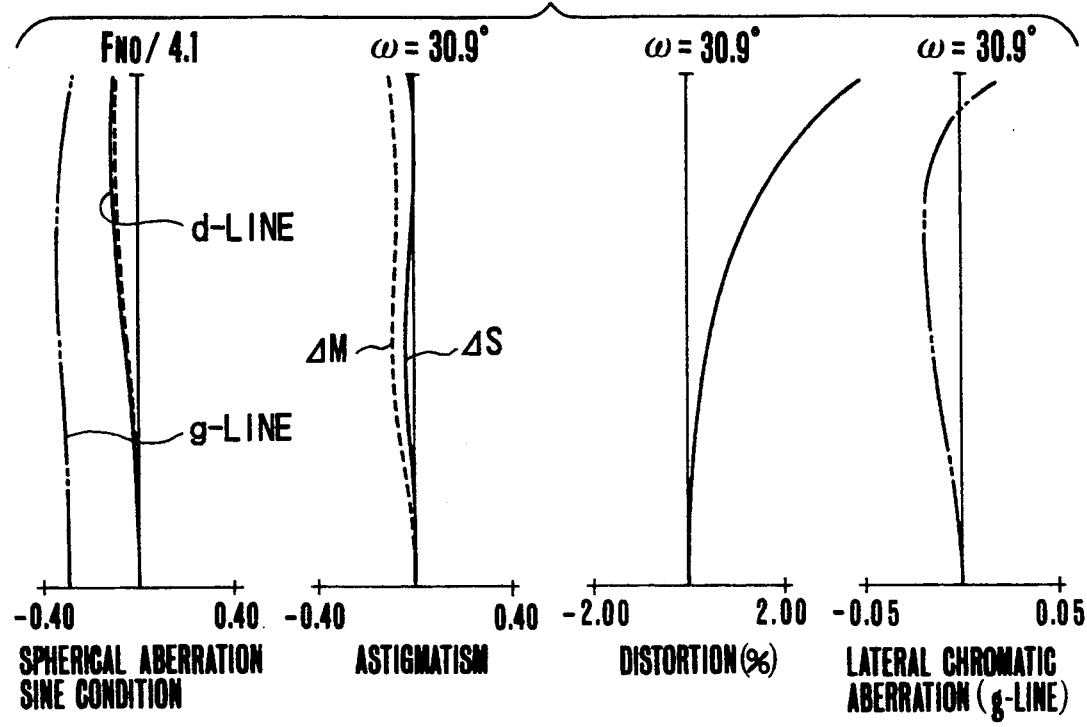
FIGS. 6(A), 6(B) and 6(C) are graphic representations of the aberrations of the numerical example 3.
Figure 6B:
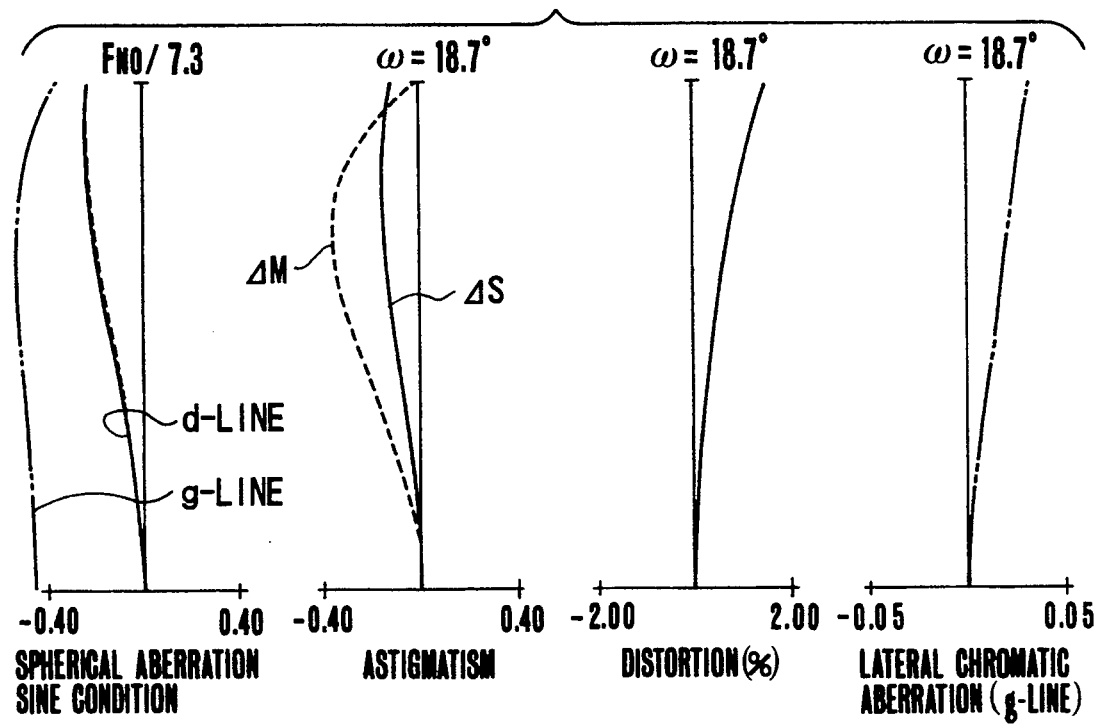
Figure 6C:
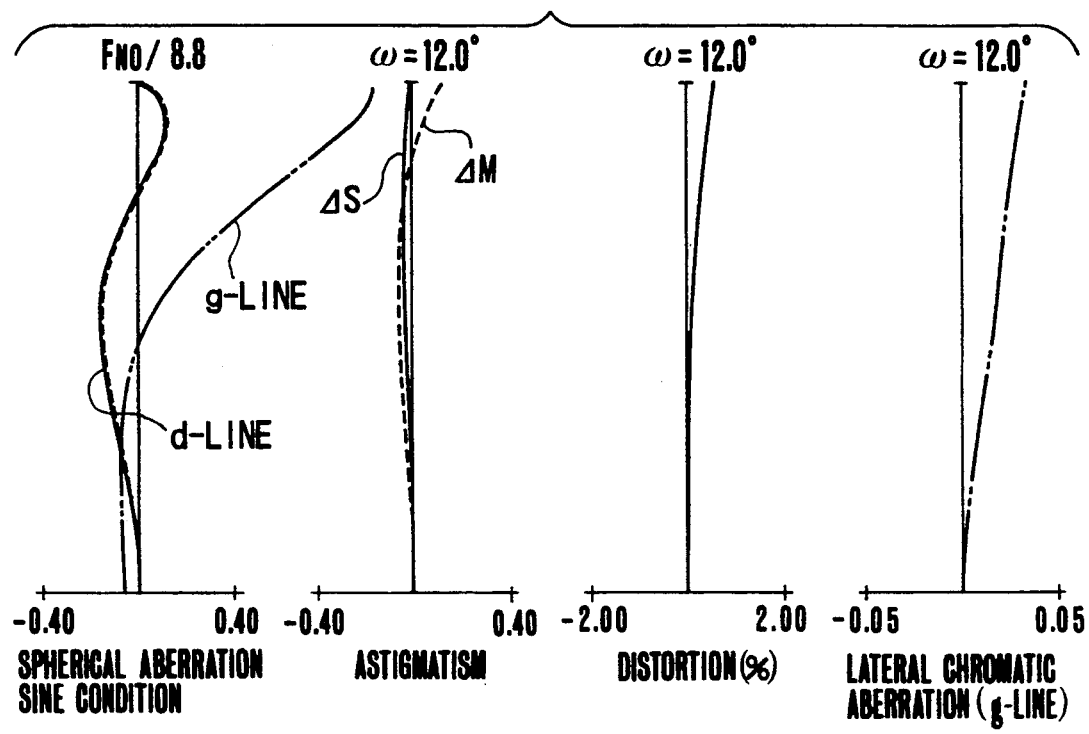
Figure 7:
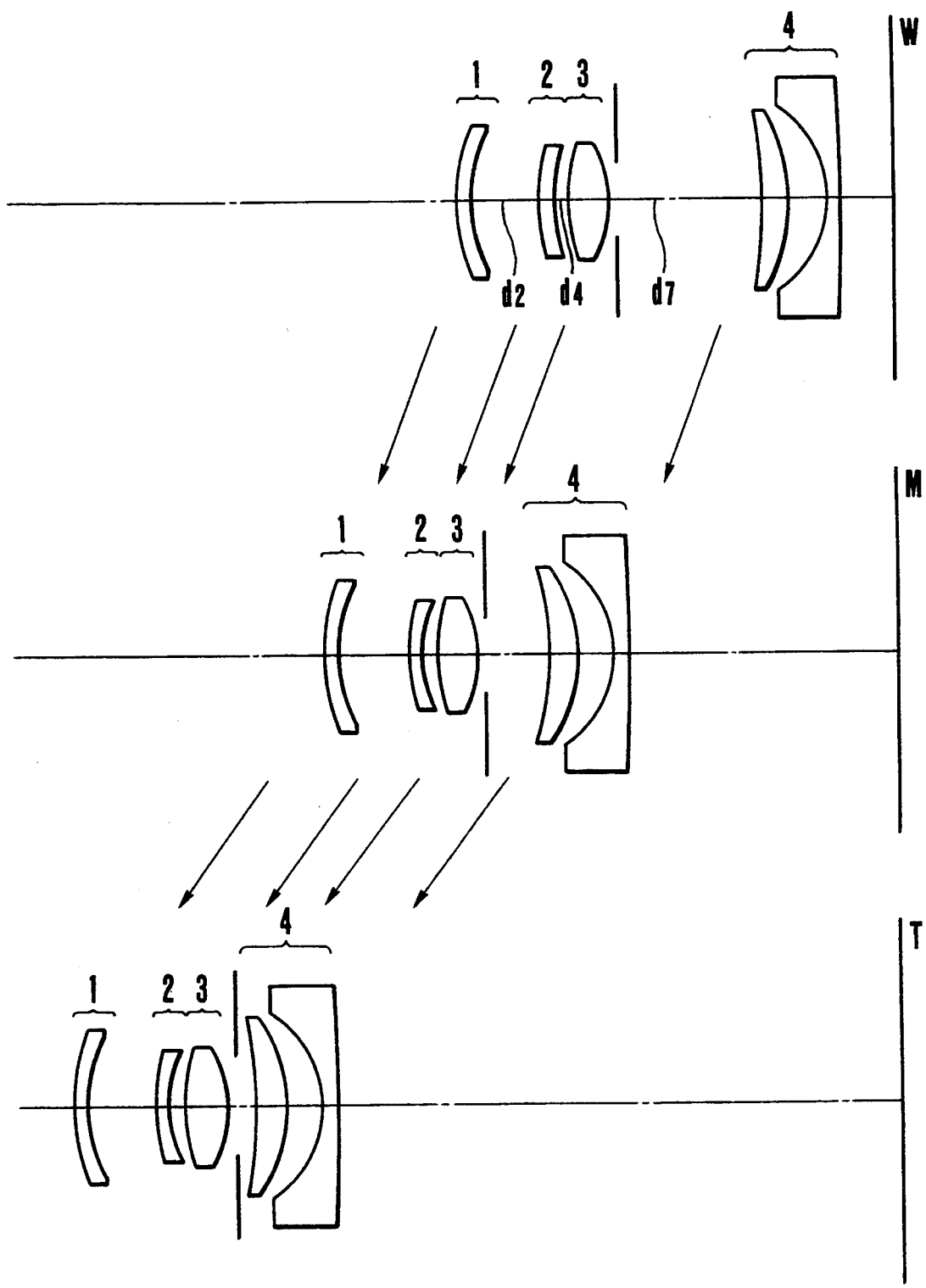
FIG. 7 is a longitudinal section view of a numerical example 4 of a zoom lens of the invention.
Figure 8:
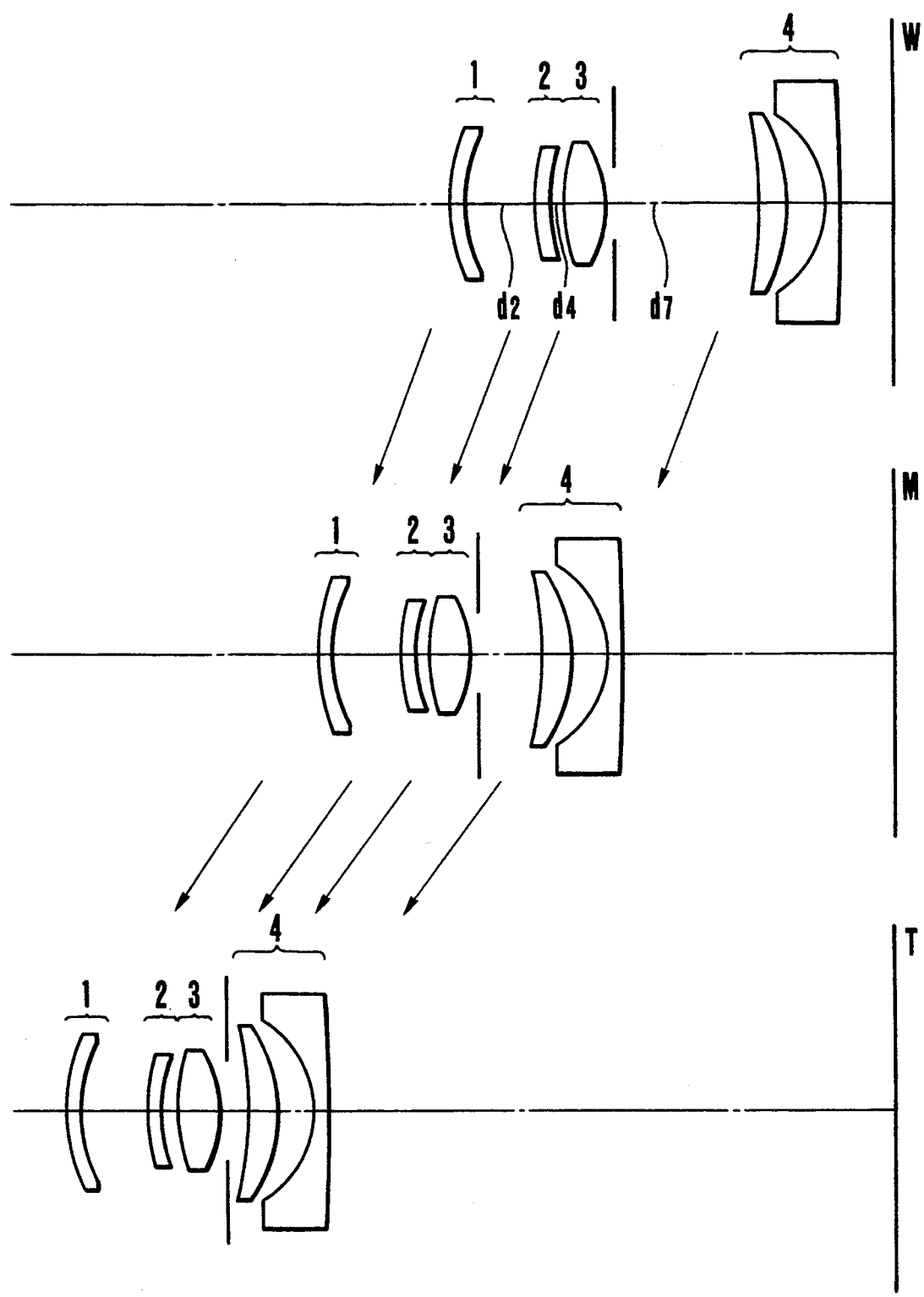
FIG. 8 is a longitudinal section view of a numerical example 5 of a zoom lens of the invention.
Figure 9:
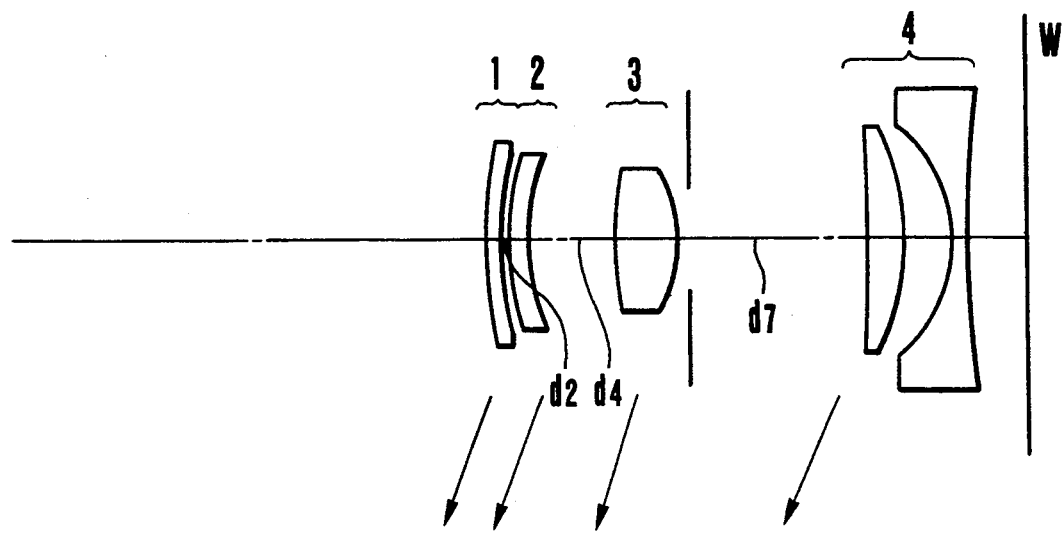
FIG. 9 is a longitudinal section view of a numerical example 6 of a zoom lens of the invention.
Figure 9:
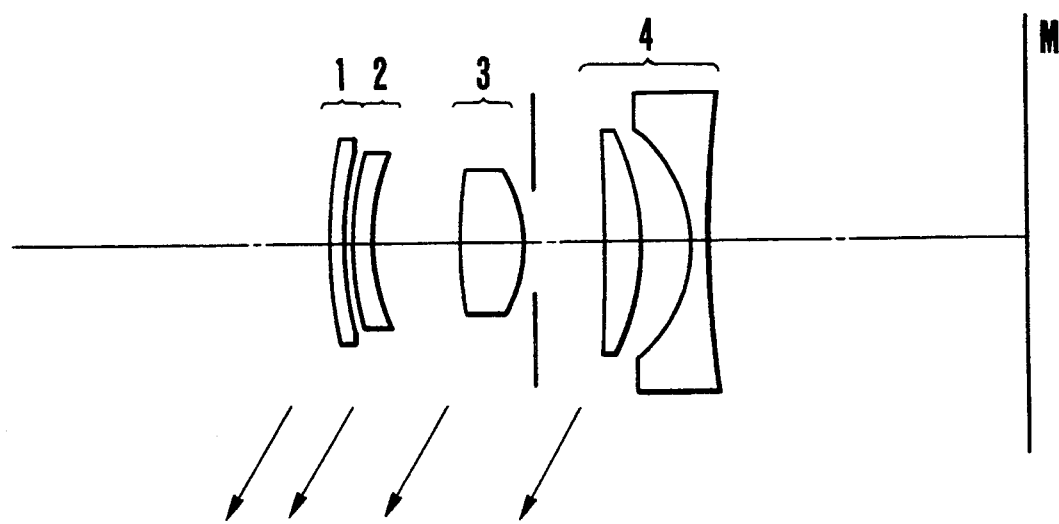
Figure 9:
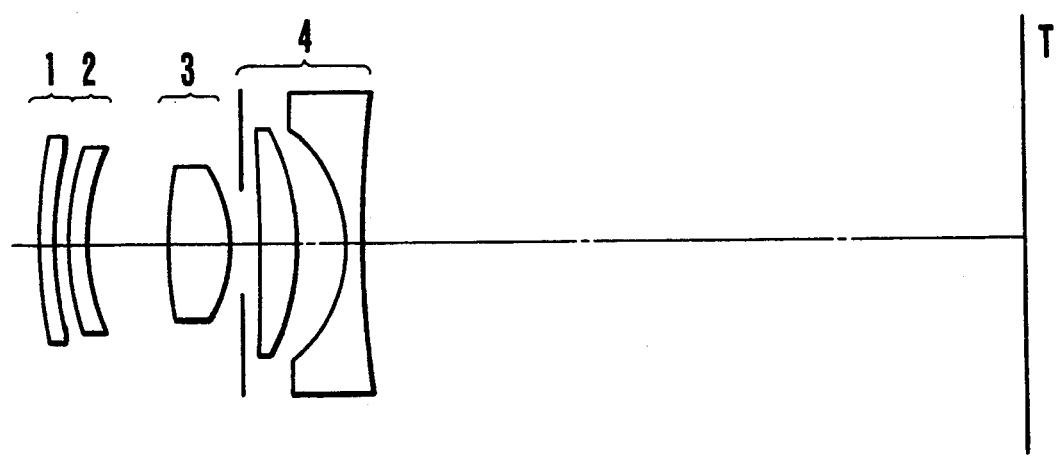
Figure 10A:
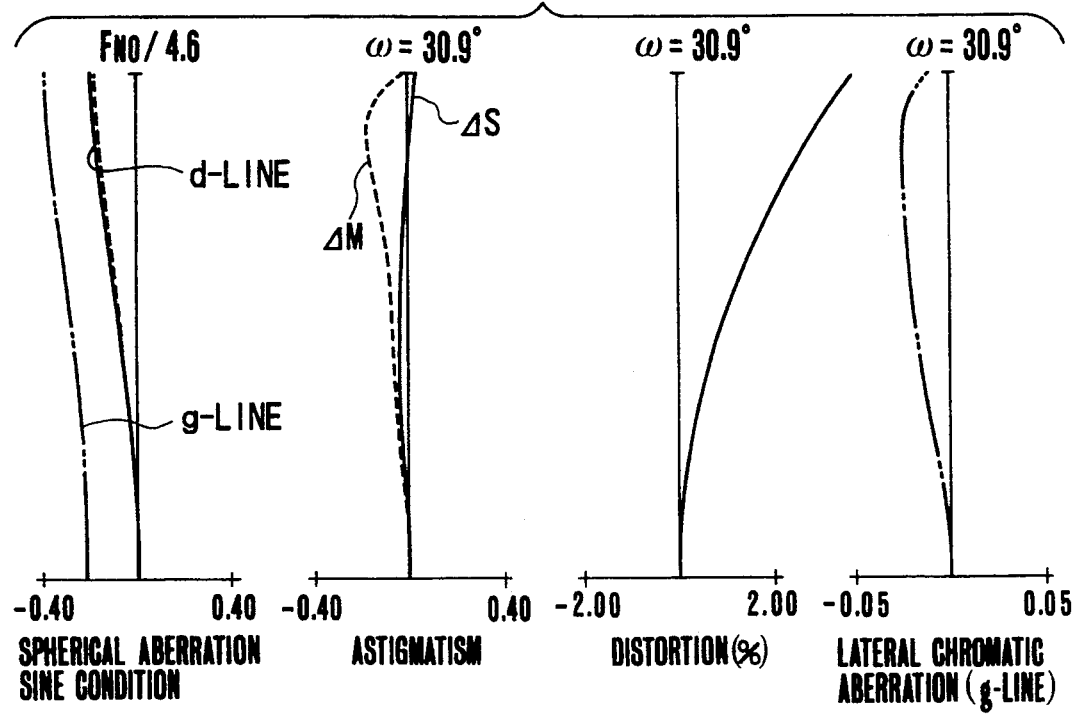
FIGS. 10(A), 10(B) and 10(C) are graphic representations of the aberrations of the numerical example 4.
Figure 10B:
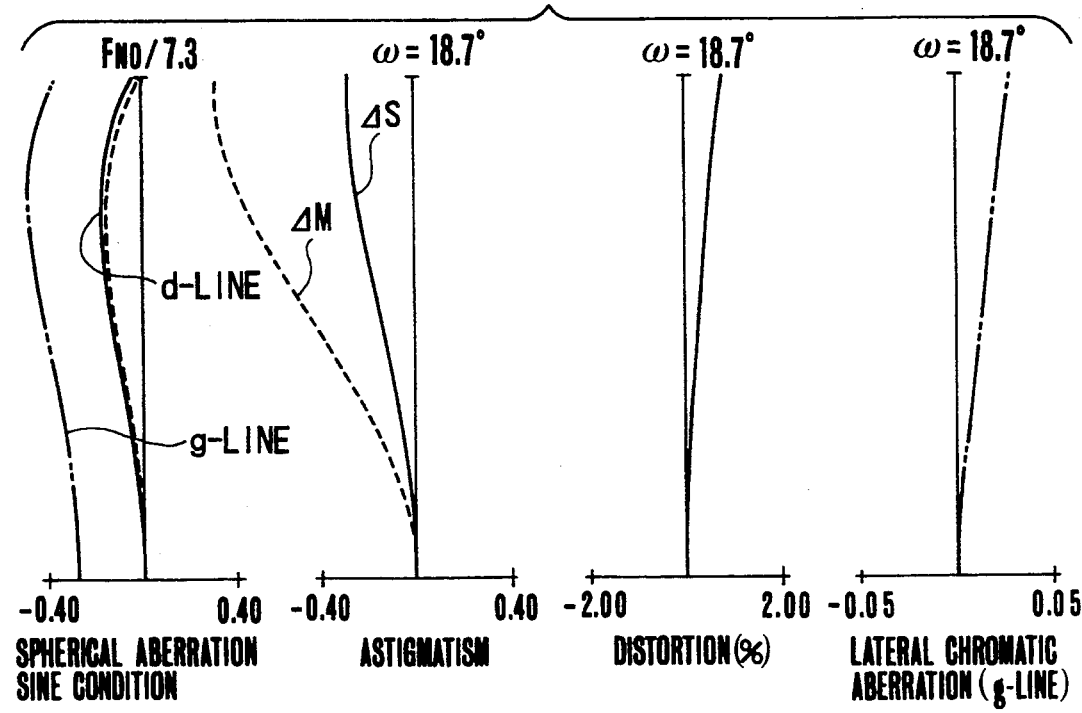
Figure 10C:
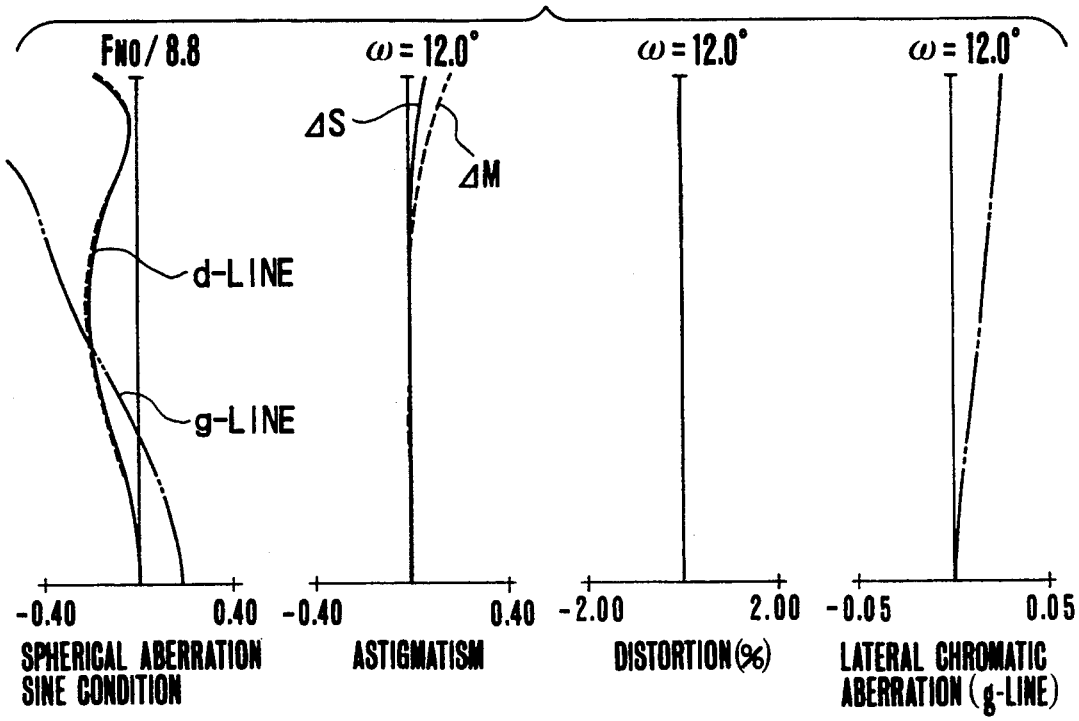
Figure 11A:
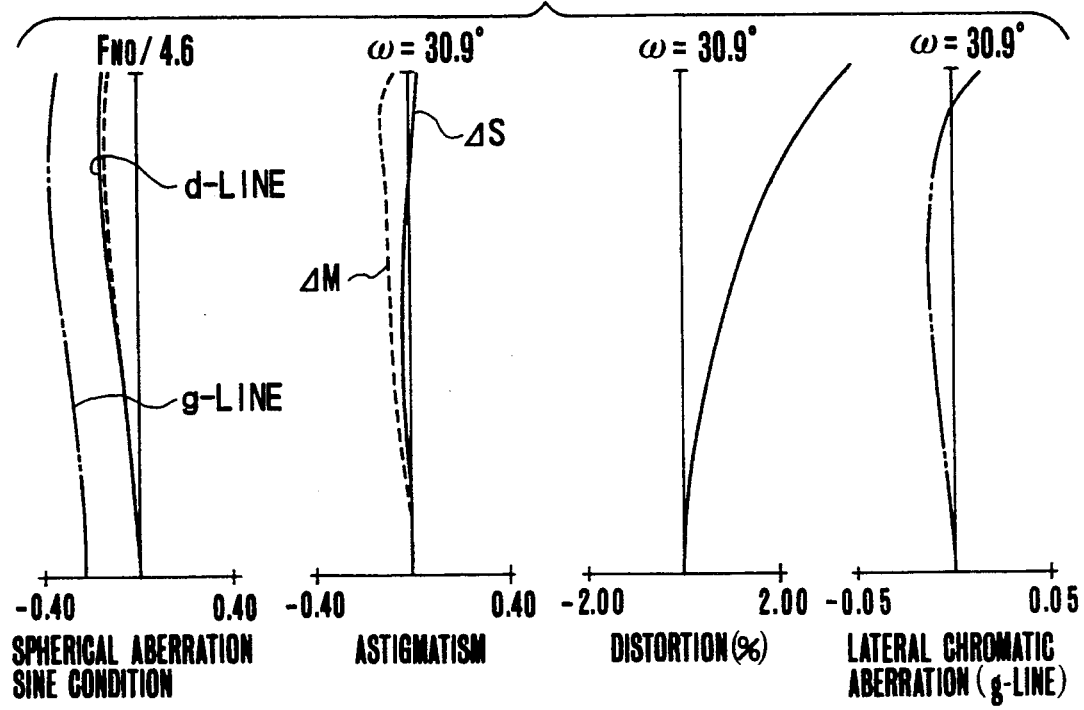
FIGS. 11(A), 11(B) and 11(C) are graphic representations of the aberrations of the numerical example 5.
Figure 11B:
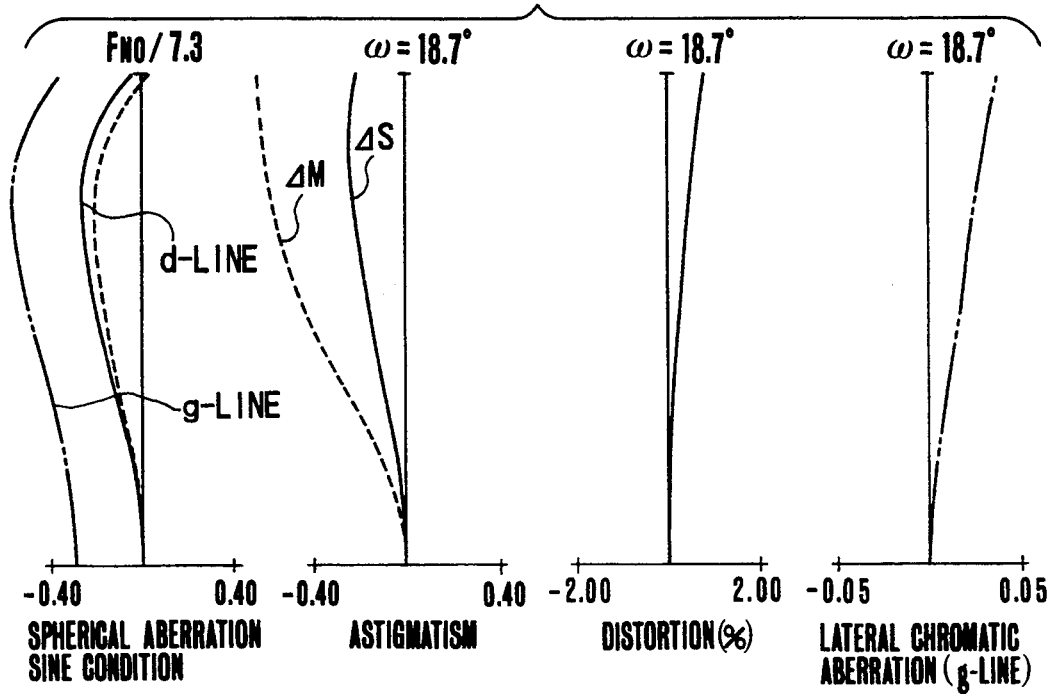
Figure 11C:
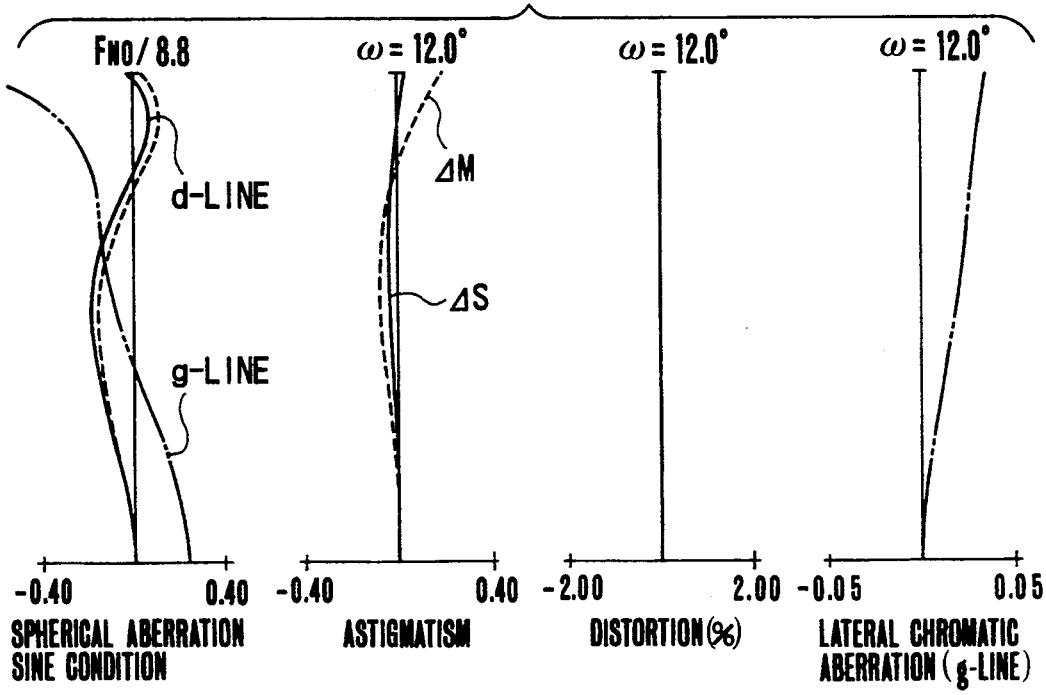
Figure 12A:
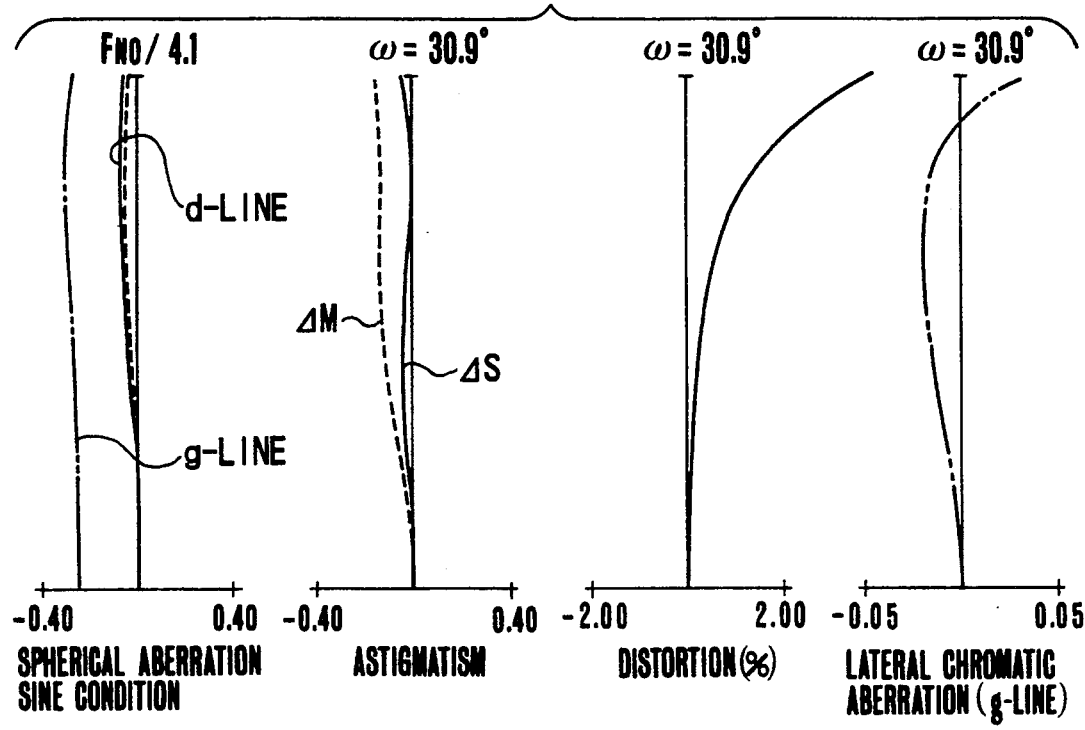
FIGS. 12(A), 12(B) and 12(C) are graphic representations of the aberrations of the numerical example 6.
Figure 12B:
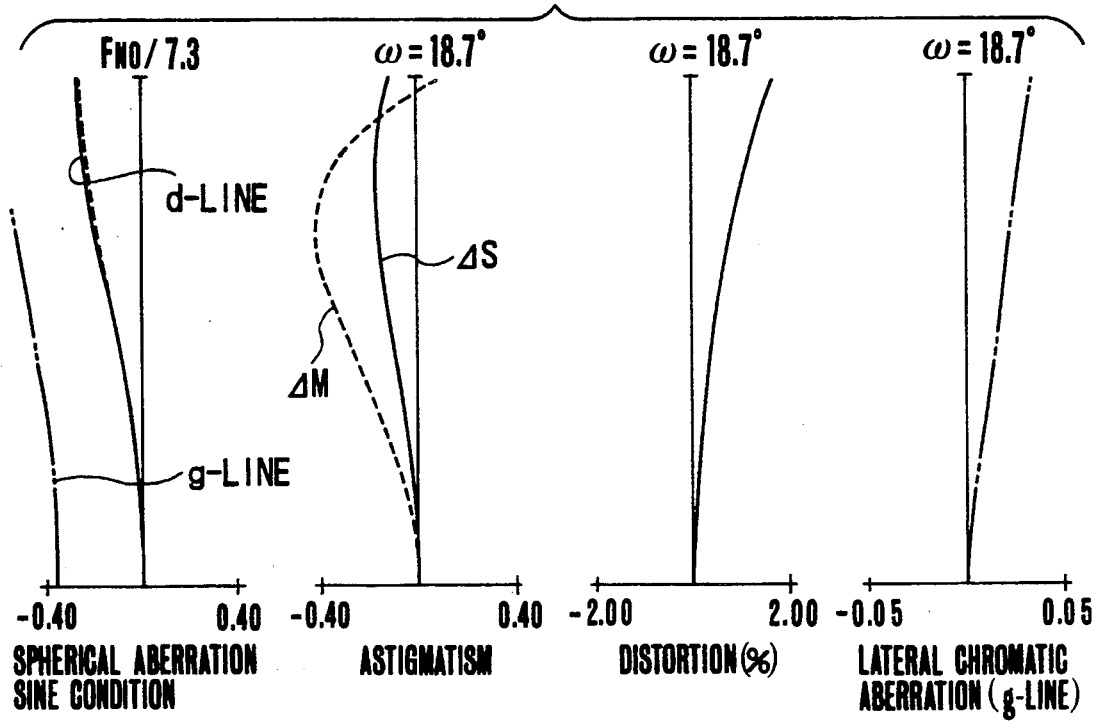
Figure 12C:
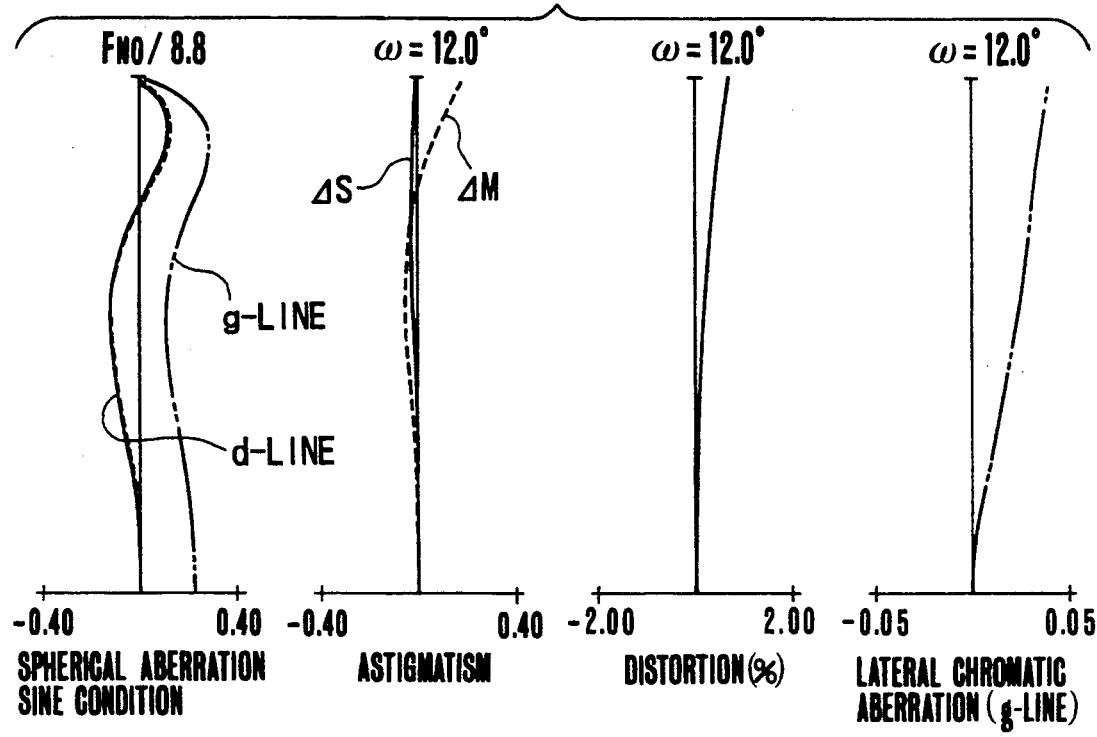

Further, it is desirable that the zoom lenses of FIGS. 1 to 3 satisfy at least one of the following conditions:

$$-100<F_1/F_3<-10 \quad (3)$$

$$-9<F_2/F_3<-3 \quad (4)$$

$$0.5<F_3/F_W<1.0 \quad (5)$$

$$-1.0<F_4/F_W<-0.5 \quad (6)$$

where $F_i$ is the focal length of the i-th lens unit and $F_W$ is the shortest focal length of the entire lens system.

The meanings of the limit values of the inequalities (3) to (6) are explained below.

The inequality (3) and the inequality (4) are concerned respectively with the ratios of the focal lengths of the first and second lens units to the focal length of the third lens unit. When the refractive power of the first or second lens unit is too weak as exceeding the lower limit of each condition, the longitudinal chromatic aberration becomes difficult to correct.

When the refractive power of the third lens unit is too weak as exceeding the upper limit, it becomes difficult to secure the back focal distance in the wide-angle end.

The inequality (5) is concerned with the ratio of the focal length of the third lens unit to the shortest focal length of the entire lens system. When the refractive power of the third lens unit is too strong as exceeding the lower limit, this lens unit becomes highly sensitive, thus becoming difficult to manufacture. So, it is no good. When the refractive power of the third lens unit is too weak as exceeding the upper limit of the inequalities of condition (5), it becomes difficult to secure the back focal distance in the wide-angle end.

The inequality (6) is concerned with the ratio of the focal length of the fourth lens unit to the shortest focal length of the entire lens system. When the refractive power of the fourth lens unit is weaker than the lower limit, a predetermined zoom ratio becomes difficult to obtain, or it interferes with the third lens unit in the telephoto end. So, it is no good. When the refractive power of the fourth lens unit is stronger than the upper limit, it becomes difficult to correct for a variation of the various aberrations.

The numerical examples are described below. The character r represents the radius of curvature, d the lens thickness or lens separation, n the refractive index for the d-line and $\nu$ the Abbe number.

The aspheric surface is expressed by the following equation for the axial deviation x in terms of the radius R of the osculating sphere and the height H from the optical axis:

$$x=R(1-(1-H^2/R^2)^{\frac{1}{2}})+AH^2+BH^4+CH^6+DH^8+EH^{10}+$$

| Numerical Example 1 (FIGS. 1, 4(A), 4(B) and 4(C)) | | | |
| --- | --- | --- | --- |
| F = 36.19–101.5 | FNo = 1:4.1–8.8 | | $2\omega = 61.8°-24.0°$ |
| r 1 = 50.000 | d 1 = 1.50 | n 1 = 1.603111 | $\nu$ 1 = 60.7 |
| r 2 = 45.651 | d 2 = Variable | | |
| r 3 = 24.178 | d 3 = 1.50 | n 2 = 1.77250 | $\nu$ 2 = 49.6 |
| r 4 = 19.520 | d 4 = Variable | | |
| r 5 = 95.414 | d 5 = 5.00 | n 3 = 1.49700 | $\nu$ 3 = 81.6 |
| r 6 = 9.695 | d 6 = 1.50 | n 4 = 1.83400 | $\nu$ 4 = 37.2 |

-continued

Numerical Example 1 (FIGS. 1, 4(A), 4(B) and 4(C))

r 7 = −12.299   d 7 = 1.00
r 8 = Stop      d 8 = Variable
r 9 = −68.986   d 9 = 3.50      n 5 = 1.59551   ν 5 = 39.2
r 10 = −26.500  d 10 = 4.64
r 11 = −13.971  d 11 = 1.70     n 6 = 1.69680   ν 6 = 55.5
r 12 = 206.234

| Variable Separation | Focal Length | | |
|---|---|---|---|
| | 36.20 | 63.84 | 101.50 |
| d 2 | 2.00 | 1.18 | 1.93 |
| d 4 | 8.32 | 8.14 | 7.38 |
| d 8 | 16.65 | 7.09 | 2.51 | r 3 is aspherical.
A = 0
B = −4.43765 × $10^{-5}$
C = −2.81409 × $10^{-7}$
D = −1.36697 × $10^{-9}$
E = −9.28334 × $10^{-12}$ r 7 is aspherical.
A = 0
B = 1.40440 × $10^{-5}$
C = 5.14255 × $10^{-8}$
D = 0, E = 0 r 10 is aspherical.
A = 0
B = −3.21458 × $10^{-5}$
C = −1.00841 × $10^{-7}$
D = −2.99727 × $10^{-10}$
E = −3.58134 × $10^{-12}$

Numerical Example 2 (FIGS. 2, 5(A), 5(B) and 5(C))

F = 36.2−101.5   FNo = 1:4.1−8.8   2ω = 61.8°−24.0° r 1 = 50.000    d 1 = 1.50      n 1 = 1.71300   ν 1 = 53.8
r 2 = 46.140    d 2 = Variable
r 3 = 22.158    d 3 = 1.50      n 2 = 1.85026   ν 2 = 32.3
r 4 = 18.121    d 4 = Variable
r 5 = 102.458   d 5 = 5.00      n 3 = 1.51633   ν 3 = 64.2
r 6 = −9.096    d 6 = 1.50      n 4 = 1.83400   ν 4 = 37.2
r 7 = −12.188   d 7 = 1.00
r 8 = Stop      d 8 = Variable
r 9 = −57.224   d 9 = 3.50      n 5 = 1.56732   ν 5 = 42.8
r 10 = −25.174  d 10 = 4.86
r 11 = −13.760  d 11 = 1.70     n 6 = 1.69680   ν 6 = 55.5
r 12 = 620.901

| Variable Separation | Focal Length | | |
|---|---|---|---|
| | 36.20 | 63.84 | 101.51 |
| d 2 | 1.00 | 1.11 | 1.78 |
| d 4 | 8.53 | 8.42 | 7.75 |
| d 8 | 16.84 | 7.24 | 2.64 | r 3 is aspherical.
A = 0
B = −3.94324 × $10^{-5}$
C = −2.31323 × $10^{-7}$
D = −1.42198 × $10^{-9}$
E = −8.95882 × $10^{-12}$ r 7 is aspherical.
A = 0
B = 1.08432 × $10^{-5}$
C = 3.94859 × $10^{-9}$
D = 0, E = 0 r 10 is aspherical.
A = 0
B = −3.23425 × $10^{-5}$
C = 2.25379 × $10^{-8}$
D = −1.4729 × $10^{-9}$
E = 3.38991 × $10^{-12}$

Numerical Example 3 (FIGS. 3, 6(A), 6(B) and 6(C))

F = 36.19−101.52   FNo = 1:4.1−8.75   2ω = 61.8°−24.0° r 1 = 50.000    d 1 = 1.50      n 1 = 1.71300   ν 1 = 53.8
r 2 = 46.140    d 2 = Variable
r 3 = 24.306    d 3 = 1.50      n 2 = 1.83400   ν 2 = 37.2
r 4 = 19.736    d 4 = Variable
r 5 = 110.499   d 5 = 5.00      n 3 = 1.51633   ν 3 = 64.2
r 6 = −9.591    d 6 = 1.50      n 4 = 1.85026   ν 4 = 32.3
r 7 = −12.403   d 7 = 1.00
r 8 = Stop      d 8 = Variable
r 9 = −66.429   d 9 = 3.50      n 5 = 1.56732   ν 5 = 42.8
r 10 = −25.943  d 10 = 4.69
r 11 = −13.927  d 11 = 1.70     n 6 = 1.69680   ν 6 = 55.5
r 12 = 258.899

| Variable Separation | Focal Length | | |
|---|---|---|---|
| | 36.20 | 63.84 | 101.52 |
| d 2 | 1.00 | 1.17 | 1.85 |
| d 4 | 8.26 | 8.09 | 7.41 |
| d 8 | 16.62 | 7.10 | 2.53 | r 3 is aspherical.
A = 0
B = −4.19556 × $10^{-5}$
C = −2.69123 × $10^{-7}$
D = −1.14486 × $10^{-9}$
E = −1.06748 × $10^{-11}$ r 7 is aspherical.
A = 0
B = 1.21244 × $10^{-5}$
C = 3.43521 × $10^{-8}$
D = 0, E = 0 r 10 is aspherical.
A = 0
B = −3.33544 × $10^{-5}$
C = −5.37753 × $10^{-8}$
D = −4.17385 × $10^{-10}$
E = −6.26109 × $10^{-13}$

TABLE 1

| | example 1 | example 2 | example 3 |
|---|---|---|---|
| $D_{3w}$-$D_{3t}$ | 14.14 | 14.20 | 14.09 |
| 3($D_{2w}$-$D_{2t}$) | 2.80 | 2.34 | 2.55 |
| 3($D_{1t}$-$D_{1w}$) | 2.80 | 2.34 | 2.55 |
| $F_1/F_3$ | −39.29 | −39.63 | −39.54 |
| $F_2/F_3$ | −5.99 | −5.59 | −5.85 |
| $F_3/F_w$ | 0.70 | 0.70 | 0.70 |
| $F_4/F_w$ | −0.76 | −0.76 | −0.75 |

There are next shown numerical examples in which the third lens unit is constructed with a positive single lens having a strong convex surface facing the image side.

Numerical Example 4 (FIGS. 7, 10(A), 10(B) and 10(C))

F = 36.2−101.5   FNo = 1:4.6−8.8   2ω = 61.8°−24.0° r 1 = 19.418    d 1 = 1.50      n 1 = 1.77250   ν 1 = 49.6
r 2 = 16.180    d 2 = Variable
r 3 = 30.730    d 3 = 1.50      n 2 = 1.83400   ν 2 = 37.2
r 4 = 18.698    d 4 = Variable
r 5 = 23.309    d 5 = 5.00      n 3 = 1.49700   ν 3 = 81.6
r 6 = −14.879   d 6 = 1.00
r 7 = Stop      d 7 = Variable
r 8 = −57.616   d 8 = 3.20      n 4 = 1.60342   ν 4 = 38.0
r 9 = −24.757   d 9 = 4.68
r 10 = −12.817  d 10 = 1.70     n 5 = 1.69680   ν 5 = 55.5
r 11 = −455.372

| Variable Separation | Focal Length | | |
|---|---|---|---|
| | 36.20 | 64.34 | 101.51 |
| d 2 | 8.53 | 8.66 | 8.49 |
| d 4 | 1.72 | 1.59 | 1.75 |
| d 7 | 16.77 | 6.93 | 2.11 | r 1 is aspherical.
A = 0

-continued

Numerical Example 4 (FIGS. 7, 10(A), 10(B) and 10(C))

$B = -3.48999 \times 10^{-5}$
$C = -2.31998 \times 10^{-7}$
$D = -9.41482 \times 10^{-10}$
$E = -5.02295 \times 10^{-12}$ Numerical Example 5 (FIGS. 8, 11(A), 11(B) and 11(C))

| F = 36.2-101.5 | | FNo = 1:4.6-8.8 | $2\omega$ = 61.8°-24.0° |
|---|---|---|---|
| r 1 = 18.582 | d 1 = 1.50 | n 1 = 1.77250 | $\nu$ 1 = 49.6 |
| r 2 = 15.811 | d 2 = Variable | | |
| r 3 = 33.582 | d 3 = 1.50 | n 2 = 1.80610 | $\nu$ 2 = 41.0 |
| r 4 = 18.105 | d 4 = Variable | | |
| r 5 = 21.679 | d 5 = 5.00 | n 3 = 1.49700 | $\nu$ 3 = 81.6 |
| r 6 = −14.535 | d 6 = 1.00 | | |
| r 7 = Stop | d 7 = Variable | | |
| r 8 = −63.081 | d 8 = 3.20 | n 4 = 1.58144 | $\nu$ 4 = 40.8 |
| r 9 = −25.420 | d 9 = 4.68 | | |
| r 10 = −12.950 | d 10 = 1.70 | n 5 = 1.69680 | $\nu$ 5 = 55.5 |
| r 11 = −985.684 | | | |

| Variable Separation | Focal Length | | |
|---|---|---|---|
| | 36.20 | 64.25 | 101.50 |
| d 2 | 10.23 | 10.10 | 9.92 |
| d 4 | 1.42 | 1.56 | 1.73 |
| d 7 | 16.66 | 6.79 | 2.06 | r 1 is aspherical.
$A = 0$
$B = -2.54915 \times 10^{-5}$
$C = -2.37724 \times 10^{-7}$
$D = 3.0728 \times 10^{-10}$
$E = -1.06680 \times 10^{-11}$
r 3 is aspherical.
$A = 0$
$B = -1.65774 \times 10^{-5}$
$C = -1.38823 \times 10^{-7}$
$D = 0, E = 0$
r 9 is aspherical.
$A = 0$
$B = -2.58518 \times 10^{-5}$
$C = -1.72514 \times 10^{-7}$
$D = 6.63195 \times 10^{-10}$
$E = -7.02040 \times 10^{-12}$ Numerical Example 6 (FIGS. 9, 12(A), 12(B) and 12(C))

| F = 36.2-101.5 | | FNo = 1:4.1-8.8 | $2\omega$ = 61.8°-24.0° |
|---|---|---|---|
| r 1 = 50.000 | d 1 = 1.50 | n 1 = 1.80518 | $\nu$ 1 = 25.4 |
| r 2 = 46.447 | d 2 = Variable | | |
| r 3 = 28.468 | d 3 = 1.50 | n 2 = 1.85026 | $\nu$ 2 = 32.3 |
| r 4 = 21.758 | d 4 = Variable | | |
| r 5 = 60.136 | d 5 = 6.00 | n 3 = 1.43387 | $\nu$ 3 = 95.1 |
| r 6 = −13.197 | d 6 = 1.00 | | |
| r 7 = Stop | d 7 = Variable | | |
| r 8 = −166.800 | d 8 = 3.50 | n 4 = 1.54814 | $\nu$ 4 = 45.8 |
| r 9 = −31.753 | d 9 = 4.83 | | |
| r 10 = −14.455 | d 10 = 1.70 | n 5 = 1.69680 | $\nu$ 5 = 55.5 |
| r 11 = 147.439 | | | |

| Variable Separation | Focal Length | | |
|---|---|---|---|
| | 36.20 | 64.26 | 101.55 |
| d 2 | 1.00 | 0.93 | 1.56 |
| d 4 | 8.86 | 8.93 | 8.30 |
| d 7 | 17.11 | 6.86 | 2.12 | r 3 is aspherical.
$A = 0$
$B = -4.15008 \times 10^{-5}$
$C = -2.15803 \times 10^{-7}$
$D = -1.37123 \times 10^{-9}$
$E = -5.32786 \times 10^{-12}$
r 6 is aspherical.
$A = 0$
$B = 3.22540 \times 10^{-5}$ -continued Numerical Example 6 (FIGS. 9, 12(A), 12(B) and 12(C))

$C = 1.10695 \times 10^{-7}$
$D = 0, E = 0$
r 9 is aspherical.
$A = 0$
$B = -3.64976 \times 10^{-5}$
$C = -5.06977 \times 10^{-8}$
$D = -5.04985 \times 10^{-10}$
$E = -1.03634 \times 10^{-12}$

TABLE 2

| | example 4 | example 5 | example 6 |
|---|---|---|---|
| $|D_{3w}-D_{3t}|$ | 14.6 | 14.59 | 14.99 |
| $3|D_{2w}-D_{2t}|$ | 0.33 | 0.95 | 1.69 |
| $3|D_{1t}-D_{1w}|$ | 0.33 | 0.95 | 1.69 |

Figure 13:
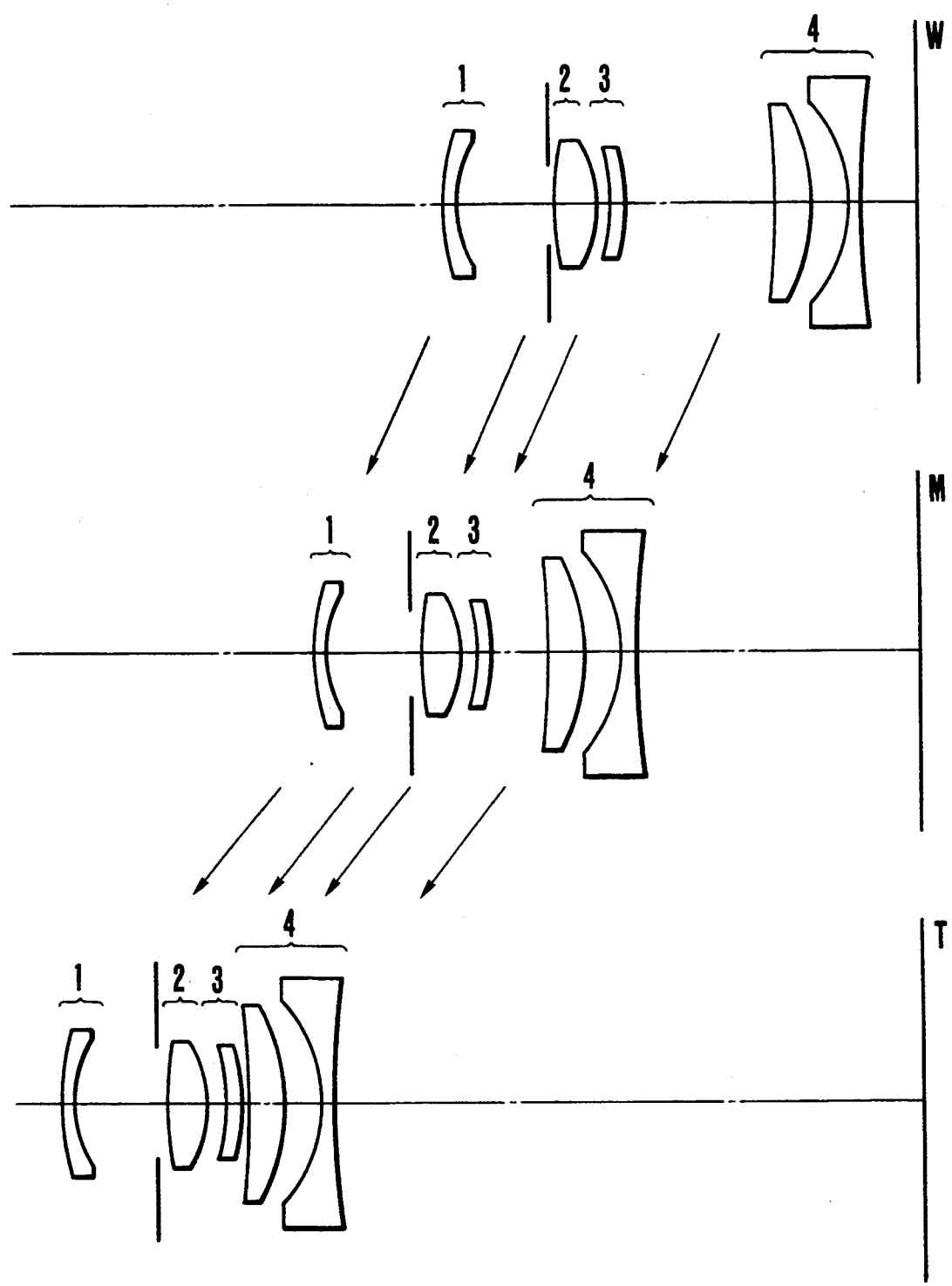
FIG. 13 is a longitudinal section view of a numerical example 7 of a zoom lens of the invention.
Figure 15A:
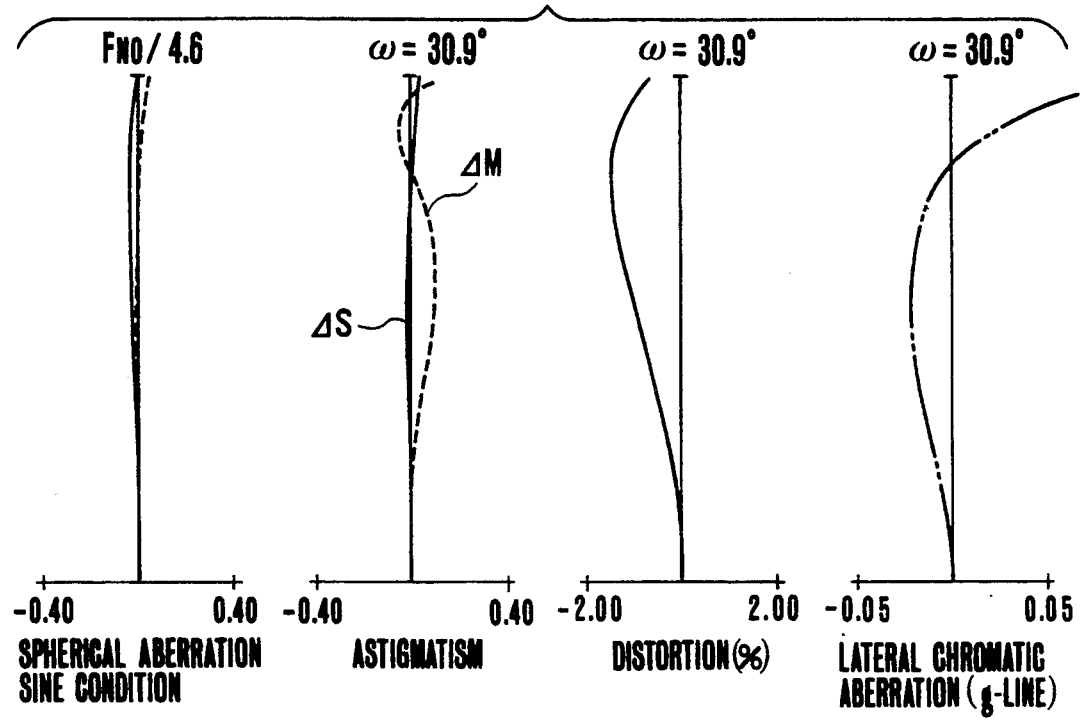
FIGS. 15(A), 15(B) and 15(C) are graphic representations of the aberrations of the numerical example 7.
Figure 15B:
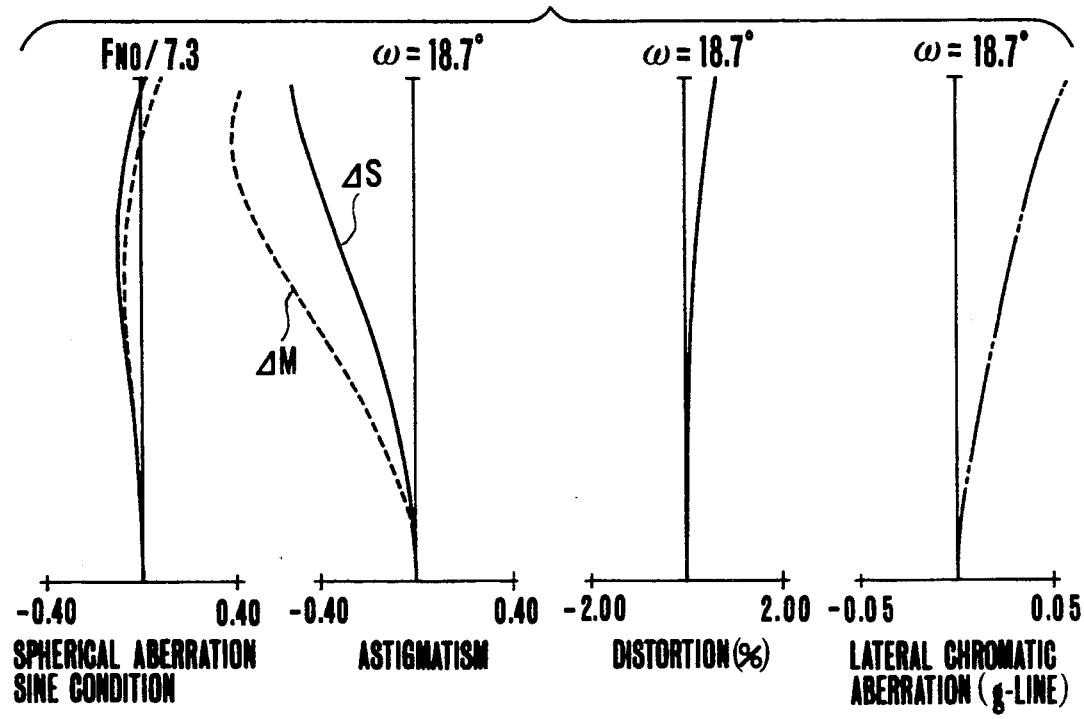
Figure 15C:
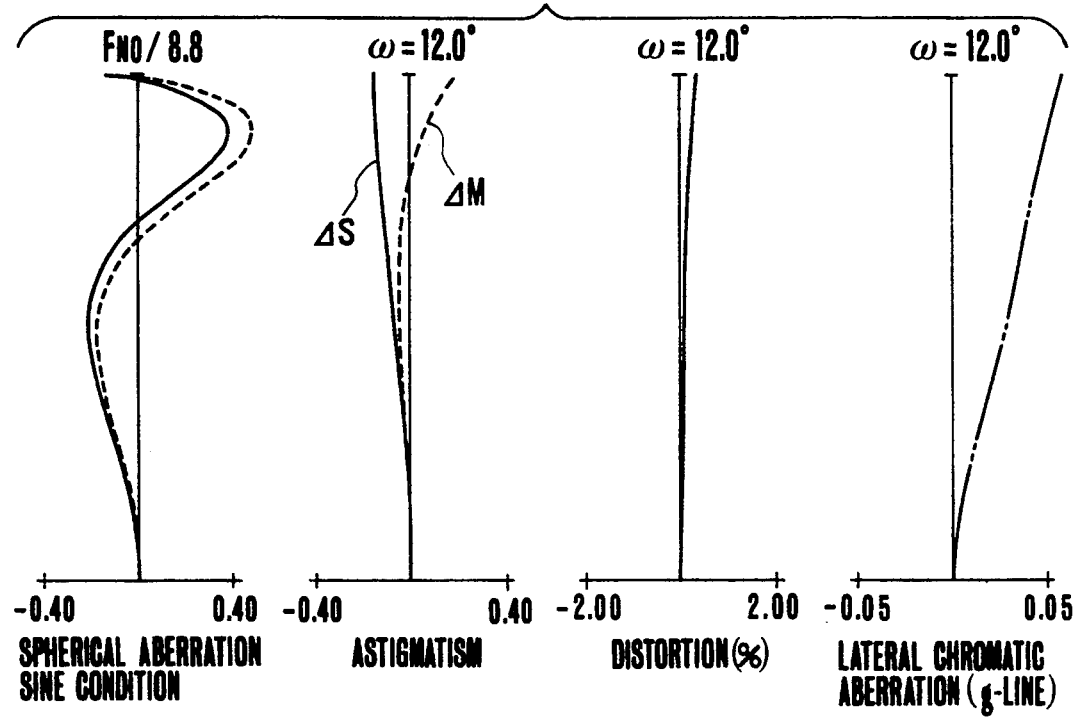
Figure 16A:
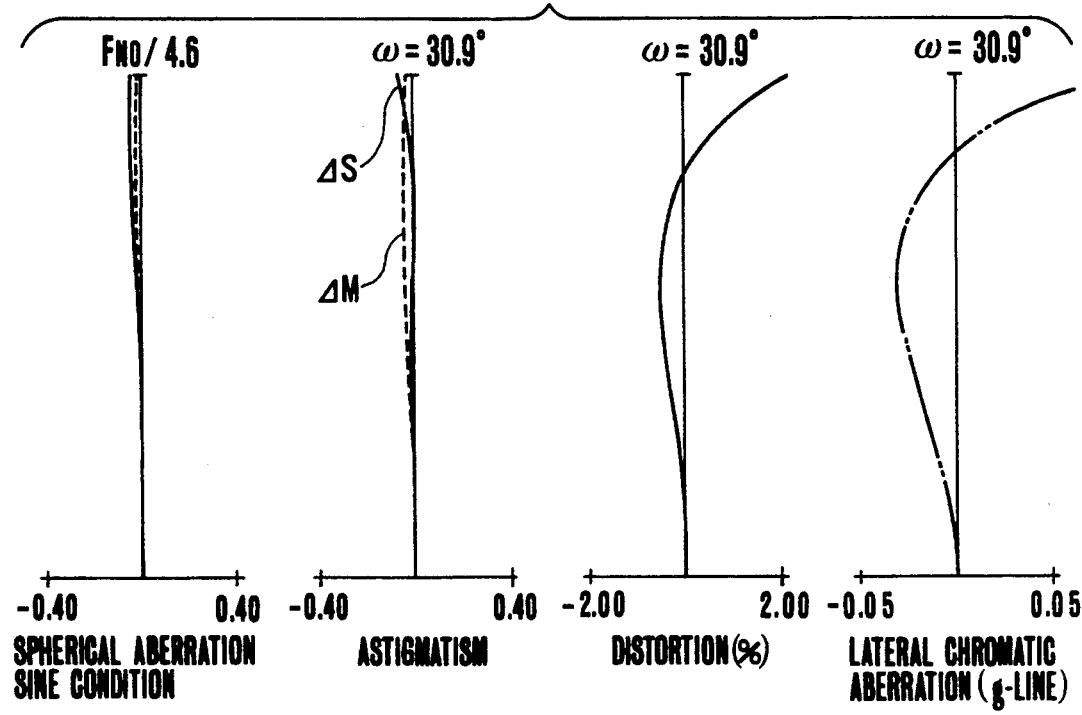
FIGS. 16(A), 16(B) and 16(C) are graphic representations of the aberrations of the numerical example 8.
Figure 16B:
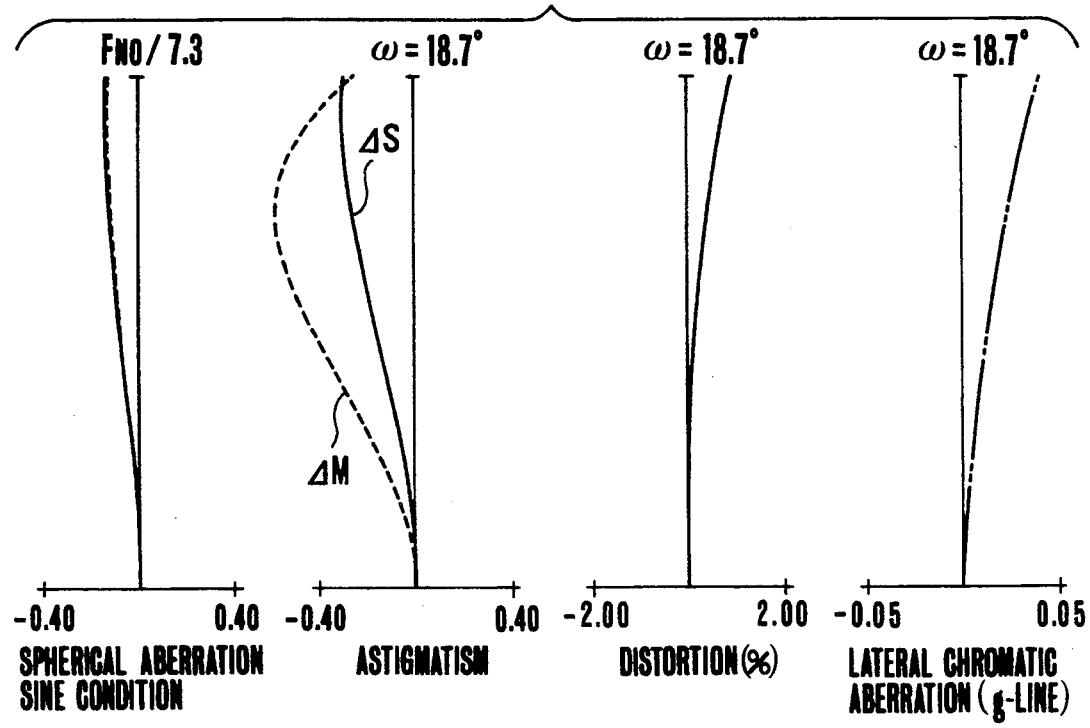
Figure 16C:
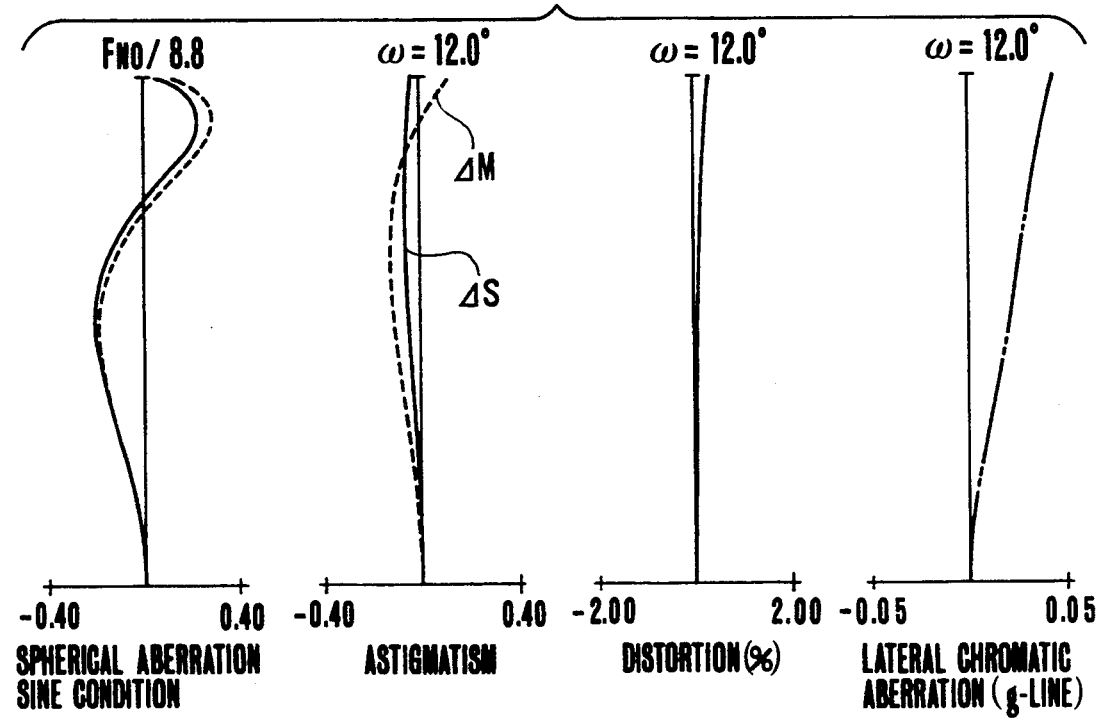

FIG. 13 and FIG. 14 are embodiments different from the above-described ones in that the signs of the refractive powers of the second and third lens units are inverted. The first to the third lens units each comprise a single lens. The first lens unit 1 is a negative meniscus lens convex toward the object side. The second lens unit 2 is a bi-convex lens having a strong convex surface facing the image side. The third lens unit is a negative meniscus lens convex toward the image side. The fourth lens unit 4 is composed of a positive meniscus lens convex toward the image side and a negative lens having a strong concave surface facing the object side. For the purpose of zooming from the wide-angle end to the telephoto end, the first to fourth lens units move toward the object side in such a way that the separation between the first lens unit 1 and the second lens unit 2 decreases, the separation between the second lens unit 2 and the third lens unit 3 increases and the separation between the third lens unit 3 and the fourth lens unit 4 decreases.

For these embodiments 7 and 8, the above-described conditions (1) and (2) also apply.

Numerical Example 7 (FIGS. 13, 15(A), 15(B) and 15(C))

| F = 36.15-101.98 | | FNo = 1:4.6-8.8 | $2\omega$ = 61.8°-24.0° |
|---|---|---|---|
| r 1 = 24.178 | d 1 = 1.50 | n 1 = 1.69680 | $\nu$ 1 = 55.5 |
| r 2 = 16.755 | d 2 = Variable | | |
| r 3 = Stop | d 3 = 1.00 | | |
| r 4 = 48.333 | d 4 = 5.00 | n 2 = 1.43387 | $\nu$ 2 = 95.1 |
| r 5 = −12.720 | d 5 = Variable | | |
| r 6 = −26.023 | d 6 = 1.50 | n 3 = 1.85026 | $\nu$ 3 = 32.3 |
| r 7 = −28.370 | d 7 = Variable | | |
| r 8 = −114.508 | d 8 = 4.00 | n 4 = 1.54814 | $\nu$ 4 = 45.8 |
| r 9 = −30.116 | d 9 = 4.64 | | |
| r 10 = −17.252 | d 10 = 1.70 | n 5 = 1.77250 | $\nu$ 5 = 49.6 |
| r 11 = 142.249 | | | |

| Variable Separation | Focal Length | | |
|---|---|---|---|
| | 36.16 | 64.09 | 101.98 |
| d 2 | 10.70 | 10.41 | 9.69 |
| d 5 | 1.50 | 1.78 | 2.50 |
| d 7 | 17.52 | 6.72 | 0.95 | r 1 is aspherical.
$A = 0$
$B = -4.1428 \times 10^{-5}$
$C = -2.07199 \times 10^{-7}$
$D = -1.80897 \times 10^{-9}$
r 5 is aspherical.
$A = 0$
$B = 5.11587 \times 10^{-5}$
$C = 1.71220 \times 10^{-7}$
$D = 0, E = 0$
r 9 is aspherical.

-continued

Numerical Example 7 (FIGS. 13, 15(A), 15(B) and 15(C))

A = 0
B = −2.85035 × 10⁻⁵
C = 1.3479 × 10⁻⁸
D = −1.88032 × 10⁻¹⁰
E = −3.14063 × 10⁻¹³

Numerical Example 8 (FIGS. 14, 16(A), 16(B) and 16(C))

F = 36.2–102.0  FNo = 1:4.6–8.8  2ω = 61.8°–24.0°

| | | | |
|---|---|---|---|
| r 1 = 24.178 | d 1 = 1.50 | n 1 = 1.77250 | ν 1 = 49.6 |
| r 2 = 17.280 | d 2 = Variable | | |
| r 3 = Stop | d 3 = 1.00 | | |
| r 4 = 62.072 | d 4 = 5.00 | n 2 = 1.49700 | ν 2 = 81.6 |
| r 5 = −14.223 | d 5 = Variable | | |
| r 6 = −26.049 | d 6 = 1.50 | n 3 = 1.80518 | ν 3 = 25.4 |
| r 7 = −28.375 | d 7 = Variable | | |
| r 8 = −112.885 | d 8 = 4.00 | n 4 = 1.54814 | ν 4 = 45.8 |
| r 9 = −29.063 | d 9 = 4.64 | | |
| r 10 = −17.130 | d 10 = 1.70 | n 5 = 1.77250 | ν 5 = 49.6 |
| r 11 = 123.475 | | | |

| Variable | Focal Length | | |
|---|---|---|---|
| Separation | 36.19 | 64.02 | 102.00 |
| d 2 | 10.93 | 10.64 | 9.92 |
| d 5 | 1.50 | 1.79 | 2.51 |
| d 7 | 17.10 | 6.52 | 0.82 | r 1 is aspherical.
A = 0
B = −3.6110 × 10⁻⁵
C = −1.98299 × 10⁻⁷
D = −1.29356 × 10⁻⁹
E = 0 r 5 is aspherical.
A = 0
B = 3.30453 × 10⁻⁵
C = 5.69713 × 10⁻⁸
D = 0, E = 0 r 9 is aspherical.
A = 0
B = −2.66865 × 10⁻⁵
C = 1.00677 × 10⁻⁷
D = −1.15295 × 10⁻⁹
E = −4.13689 × 10⁻¹²

TABLE 3

| | example 7 | example 8 |
|---|---|---|
| $|D_{3w}-D_{3t}|$ | 16.57 | 16.28 |
| $3|D_{2w}-D_{2t}|$ | 3.01 | 3.03 |
| $3|D_{1t}-D_{1w}|$ | 3.01 | 3.03 |

The above-described numerical examples have achieved a zoom ratio of 3 and a good correction of aberrations as shown in FIGS. 4(A), 4(B) and 4(C) through FIGS. 6(A), 6(B) and 6(C), FIGS. 10(A), 10(B) and 10(C) through FIGS. 12(A), 12(B) and 12(C), FIGS. 15(A), 15(B) and 15(C), and FIG. 16(A), 16(B) and 16(C). Incidentally, FIGS. 4(A), 5(A), 6(A), 10(A), 11(A), 12(A), 15(A) and 16(A) show the aberration curves in the wide-angle end; FIGS. 4(B), 5(B), 6(B), 10(B), 11(B), 12(B), 15(B) and 16(B) in an intermediate position; FIGS. 4(C), 5(C), 6(C), 10(C), 11(C), 12(C), 15(C) and 16(C) in the telephoto end. The necessary total number of constituent lens elements is very few in view of the zoom ratio.

What is claimed is:

1. A zoom lens comprising, in order from a long conjugate side, a first lens unit of negative refractive power, a second lens unit of negative refractive power, a third lens unit of positive refractive power and a fourth lens unit of negative refractive power, wherein during zooming a separation between each adjacent two of said first, second, third and fourth lens units is varied.

2. A zoom lens according to claim 1, wherein said first, second, third and fourth lens units move toward the long conjugate side when zooming from a wide-angle end to a telephoto end.

3. A zoom lens according to claim 2, wherein said fourth lens unit comprises, in order from the long conjugate side, a positive lens having a convex surface facing a short conjugate side and a negative lens having a concave surface facing the long conjugate side.

4. A zoom lens according to claim 2, wherein, when zooming from the wide-angle end to the telephoto end, a separation between said first and second lens units increases, a separation between said second and third lens units decreases, and a separation between said third and fourth lens units decreases.

5. A zoom lens according to claim 1, satisfying the following conditions:

$$|D_{3w}-D_{3t}|>3|D_{2w}-D_{2t}|$$

$$|D_{3w}-D_{3t}|>3|D_{1t}-D_{1w}|$$

where $D_{iw}$ is a separation between the i-th lens unit and the (i+1)st lens unit in a wide-angle end, and $D_{it}$ is a separation between the i-th lens unit and the (i+1)st lens unit in a telephoto end.

6. A zoom lens according to claim 1 satisfying the following conditions:

$$-100<F_1/F_3<-10$$

$$-9<F_2/F_3<-3$$

$$0.5<F_3/F_W<1.0$$

$$-1.0<F_4/F_W<-0.5$$

where $F_i$ is the focal length of the i-th lens unit and $F_w$ is the shortest focal length of the zoom lens.

7. A zoom lens according to claim 1, wherein said first lens unit and said second lens unit each comprise a negative single lens element.

8. A zoom lens according to claim 1, wherein said third lens unit comprises a cemented lens composed of positive and negative lens elements.

9. A zoom lens according to claim 1, wherein said first and third lens units move in unison during zooming.

10. A zoom lens according to claim 1, wherein at least one surface of said first or second lens unit, at least one surface of said third lens unit and at least one surface of said fourth lens unit are aspherical.

11. A zoom lens according to claim 1, wherein said first, second and third lens units each are constructed with a single lens element.

12. A zoom lens comprising, in order from a long conjugate side, a first lens unit of negative refractive power, a second lens unit, a third lens unit, and a fourth lens unit of negative refractive power, said second and third lens units having refractive powers of opposite sign to each other, wherein during zooming a separation between each adjacent two of said first, second, third and fourth lens units is varied, and wherein the following conditions are satisfied:

$$|D_{3w}-D_{3t}|>3|D_{2w}-D_{2t}|$$

$$|D_{3w}-D_{3t}|>3|D_{1t}-D_{1w}|$$

where $D_{iw}$ is a separation between the i-th lens unit and the (i+1)st lens unit in a wide-angle end, and $D_{it}$ is a separation between the i-th lens unit and the (i+1)st lens unit in a telephoto end.

13. A zoom lens according to claim 12, satisfying the following condition:

$$|D_{3w}-D_{3t}|>3|D_{1t}-D_{1w}|$$

where $D_{iw}$ is a separation between the i-th lens unit and the (i+1)st lens unit in a wide-angle end, and $D_{it}$ is a separation between the i-th lens unit and the (i+1)st lens unit in a telephoto end of the zoom lens.

14. A zoom lens according to claim 13, satisfying the following condition:

$$|D_{3w}-D_{3t}|>3|D_{2w}-D_{2t}|.$$

15. A zoom lens according to claim 12, wherein said first, second, and third lens units each are constructed with a single lens element.

* * * * *

UNITED STATES PATENT AND TRADEMARK OFFICE
CERTIFICATE OF CORRECTION

PATENT NO.  : 5,365,376
DATED       : November 15, 1994
INVENTOR(S) : YOSHINORI ITOH It is certified that error appears in the above-indentified patent and that said Letters Patent is hereby corrected as shown below:

<u>COLUMN 1:</u>

Line 37, "positive," should read --positive--; and "power or two, lenses," should read --power, or two lenses,--.

<u>COLUMN 2:</u>

Line 30, "units" should read --unit--.

<u>COLUMN 3:</u>

Line 67, "the" should read --do the--.

<u>COLUMN 4:</u>

Line 58, "$EH^{10}+$" should read --$EH^{10}+\ldots$--.

UNITED STATES PATENT AND TRADEMARK OFFICE
CERTIFICATE OF CORRECTION

PATENT NO. : 5,365,376
DATED : November 15, 1994
INVENTOR(S) : YOSHINORI ITOH

It is certified that error appears in the above-indentified patent and that said Letters Patent is hereby corrected as shown below:

COLUMN 10:

Line 2, "zooming" should read --zooming,--.

Signed and Sealed this

Fourth Day of July, 1995

BRUCE LEHMAN

Attest:

Attesting Officer

Commissioner of Patents and Trademarks